United States Patent
Sanderovitz et al.

(10) Patent No.: US 8,620,230 B2
(45) Date of Patent: Dec. 31, 2013

(54) WIRELESS NETWORK ARCHITECTURE AND METHOD FOR BASE STATION UTILIZATION

(76) Inventors: Amichay Sanderovitz, Kyriat Bialik (IL); Avi Steiner, Kyriat Motzkin (IL); Shaike Schatzberger, Haifa (IL)

(*) Notice: Subject to any disclaimer, the term of this patent is extended or adjusted under 35 U.S.C. 154(b) by 703 days.

(21) Appl. No.: 12/641,158

(22) Filed: Dec. 17, 2009

(65) Prior Publication Data
US 2010/0157901 A1 Jun. 24, 2010

Related U.S. Application Data

(63) Continuation of application No. PCT/IL2008/000828, filed on Jun. 18, 2008.

(60) Provisional application No. 60/929,198, filed on Jun. 18, 2007, provisional application No. 60/929,199, filed on Jun. 18, 2007.

(51) Int. Cl.
*H04B 1/02* (2006.01)
*H04W 36/00* (2009.01)
*H04B 15/00* (2006.01)

(52) U.S. Cl.
USPC ........... 455/101; 455/438; 455/439; 455/442; 455/443; 455/502; 455/503; 455/522

(58) Field of Classification Search
USPC ......... 455/101, 436, 438, 439, 442, 443, 502, 455/503, 522; 370/230, 328, 329, 338, 352
See application file for complete search history.

(56) References Cited

U.S. PATENT DOCUMENTS

| | | | |
|---|---|---|---|
| 5,276,703 A | | 1/1994 | Budin et al. |
| 6,470,188 B1 | | 10/2002 | Ohtani et al. |
| 6,477,380 B1 | | 11/2002 | Uehara et al. |
| 6,493,759 B1 | | 12/2002 | Passman |
| 6,711,409 B1 | | 3/2004 | Zavgren, Jr. et al. |
| 6,801,571 B1 | | 10/2004 | Hyziak et al. |
| 2010/0098014 A1* | | 4/2010 | Larsson ........................ 370/329 |

OTHER PUBLICATIONS

Notification of Transmittal of the International Search Report and the Written Opinion of the International Searching Authority, or the Declaration dated Nov. 10, 2008 issued in parent Appln. No. PCT/IL2008/000828.

* cited by examiner

*Primary Examiner* — Inder Mehra
(74) *Attorney, Agent, or Firm* — Holtz, Holtz, Goodman & Chick, PC

(57) ABSTRACT

Wireless network system including a plurality of base stations each configured to manage active links to mobile stations within a range; and a controller configured to control the base stations to provide at least two of the active links from two different base stations simultaneously to a given mobile station in integral manner for joint processing.

27 Claims, 29 Drawing Sheets

WIRELESS NETWORK ARCHITECTURE AND METHOD FOR BASE STATION UTILIZATION

The present application claims the benefit of U.S. Provisional Patent Applications No. 60/929,198 and No. 60/929,199, both filed on 18 Jun. 2007, and is a Continuation of PCT/IL 2008/00828 filed on 18 Jun. 2008.

FIELD AND BACKGROUND OF THE INVENTION

The present invention, in some embodiments thereof, relates to a wireless network architecture and method for base station utilization and, more particularly, but not exclusively, to such a method and architecture applied to wireless networks including cellular networks and including networks based on GSM and CDMA, and on WiFi, WiMAX, UMTS-LTE, Zig-Bee or UMB and to other wireless networks.

Communication systems and networks are usually characterized by a sender who wishes to transmit a message to a destination, which is located physically remote. The message can be signal, such as voice, video, images, sound, or also data, such as computer files. The communication takes place over some channel, which can be air, wire, fiber-optic line, other communication network etc. The communication starts by a signal which is sent to the channel by the sender. Because the channel usually changes the signal, and the receiver receives the signals with the usually random changes, the destination can get a different message than the one the sender wished to transmit. In order to avoid such events, the sender, or other proxy of the sender, usually uses some forms of protection against such errors. Such protection can include error correcting code (ECC), which adds redundancy to bit streams or other information forms. Such redundancy adding at the transmitter is sometimes called encoding. The destination then uses the added redundancy to select the most probable message that was sent by the sender. This processing is sometimes called decoding.

In case the destination receives inputs from multiple channels, and/or senders, where sometimes the messages from some senders and channels (e.g. multiple antennas or multiple receiving base-stations) may statistically depend on each other, the destination can use such dependency to more efficiently decode the received signals, and thus also to reduce the probability of an erroneous message reception.

Compression is a process that reduces the amount of bits used to describe certain information. Compression can be done in many ways; one of them is to use the said error correcting codes in order to obtain compression. This is because redundancy is removed in the said error correcting decoding.

Wireless communications systems and networks are frequently arranged as one or more cells or coverage areas. Each cell normally includes a base station which supports communications with mobile terminals that are located in, or enter, the communications range of the cell's base station. Transmission of signals from the base station to the mobile is often called a downlink. In contrast, transmission from the mobile to the base station is commonly referred to as an uplink. The present teaching deals with the uplink channel by way of example, and the skilled person will appreciate its application to the downlink channel.

In order to efficiently use limited communications resources, base stations may allocate different resources to different mobile nodes depending on the devices' bandwidth needs. In a multiple access system, several nodes may be transmitting data, e.g., in the form of symbols, to a base station at the same time using different frequencies/time-slots/codes. This is common in orthogonal frequency division multiple access (OFDMA) systems. In such systems, it is important that symbols from different mobile nodes arrive at the base station in a synchronized manner, e.g., so the base station can properly determine the symbol period to which a received symbol belongs and signals from different mobile nodes do not interfere with each other.

The base station uses its antennas to receive the signals that were wirelessly transmitted and then processes the received signals from the antennas to bit streams. These signals often include an ECC, in order to improve the overall system performance and reliability. The ability of the base station to efficiently process and decode the received signals, establishes both wireless network capacity, and cell size.

Both base-station and client have enough processing power to determine reliable decoding (by e.g. CRC which is embedded in every packet). In order to reduce equipment cost, the base station node can be divided into several separated parts, where the antenna can be installed elsewhere, and specifically, several receiving antennas can be connected by several possible means to the same processing/decoding unit.

When the network is wireless, the transmission between any two network nodes can be compromised by varying physical conditions, such as shadowing objects, moving reflections, and many more. One way to mitigate such effects is to use sufficient margins, so the overall performance of the wireless network is reduced. Another way is to use several antennas at both receiving and transmitting nodes, such that the physical conditions on all antennas are less susceptible to a single fading event.

Several receptions for the processing unit at the base station can be used, for example by using radio signal repeaters or relays.

Processing of the received signal from several receiving nodes can be done also by means of cooperation between several base stations (destination nodes) which can receive sufficiently high quality observations of the transmitting mobile terminal Such cooperation is done for example by forwarding received signals of helping base-stations to other base station, which jointly decodes all observations.

The forwarding base stations, referred to as the helping nodes in this document, can forward the received signal as is, or after some processing or ECC encoding, which would improve the wireless network stability and overall performance.

The way the forwarded signal travels from the helping base station to the destination base station can be through a fiber optic channel, wired line, wireless radio signal, or any other means.

The destination base station processes and/or decodes and/or decompresses the received signals from the helping base station, so that errors can be corrected and efficiency maintained, and then processes the original signal from the mobile terminal, only that now the received signal is less susceptible to the physical conditions of the channel.

Compress and forward relaying technique is a known concept which means that a helper node uses compression and error correcting coding on the received signal, for better utilization of network resources, and then forwards the compressed and encoded signal through the channel that separates the helping node and the destination node.

Known techniques for compress and forward use separated channel codes for the ECC and the compression, such as LDPC codes, Turbo codes, and convolution codes.

In many wireless networks there exist links between the base-stations (BS), which are sometimes referred to as access nodes. The links between BSs are sometimes used for performing soft-handovers or for backhaul purposes, when network infrastructure is not available at all BSs.

Soft handover is a technique to improve the communication reliability of highly mobile clients, and allow high quality of service during handover between BSs. In order to reduce the probability of disconnection, multiple BSs may be involved in maintaining the connection with a client node, and may utilize macro diversity gains for this purpose. There are different forms and protocols for implementing macro-diversity techniques, of which some are specified in cellular standards.

Some standards specify the protocols required to be supported by BSs and client nodes in order to perform soft handover in the form of macro-diversity. For example, in order to perform soft handovers between WiMAX 802.16e BSs, the client node has to allow and support a soft-handover protocol.

The related art mentions wireless network systems, such as in the following patents for example.

U.S. Pat. No. 5,276,703 to Budin et al., referred as Budin hereinbelow, discloses reference to multiple access communication systems. In particular, the disclosure relates to a local area network including at least one hub unit, one or more associated station units, and a wireless communication link between each hub unit and its associated station units. The wireless communication link includes a wireless radio frequency signal path for transferring information from each hub unit to all of its associated station units at a first frequency, f1. The communication link also includes a wireless radio frequency signal path for transmitting information from each station unit to its associated hub unit at a second frequency, f2.

Budin teaches a wireless communications link between each hub unit and its associated station units, thereby limiting each hub to communications only from the hub to the associated stations and back.

Furthermore, Budin teaches a downlink for transferring information from each hub unit to all of its associated station units, but not two hub units that communicate jointly with a single station unit.

Moreover, Budin divulges an uplink for transmitting information from each station unit to its associated hub unit, thus restricting communication from each station unit to only one single hub station.

However, according to one aspect of the present invention, it would be advantageous to provide a wireless network system having a plurality of network nodes, where each node or hub unit is configured to manage active links to mobile stations, i.e. station units. Such a wireless network system has a controller configured to control the base stations to provide at least two active links from at least two different network nodes simultaneously to a given mobile station unit in integral manner for joint signal processing of both active links.

Yet more, according to another aspect of the present invention, it would be beneficial to use error correction decoding for joint error correction, which is a novel technique operable only with joint reception. In contrast, Budin teaches the use of Trellis Modulation Encoding processing, but does not disclose, and therefore does evidently not operate joint processing.

U.S. Pat. No. 6,470,188 to Ohtani et al., referred as Ohtani hereinbelow, teaches a method for handover, which recovers a sync state even if an out-of-sync state arises. Furthermore, Ohtani enables proper and effective quality control and informing of the out-of-sync state.

Ohtani discloses a method for handover between base stations. However, Ohtani does not consider the benefits of combining the signal information of a helper link combined with the signal information of a main link, as recited according to still another aspect of the present invention.

Furthermore, Ohtani discloses a method for handover utilizing a first and a second transmission route. The first transmission route connects a diversity handover trunk with a mobile station by way of a first base station, and therewith causes a first delay time. The second transmission route, which connects the diversity handover trunk with the mobile station by way of a second base station causes a second delay time, which is longer than the first delay time.

According to yet another aspect of the present invention, it would be advantageous to provide a joint processor that is configured such that one active communication link is the helper Link associated with another communication link, on both of which links the joint processing is performed. Thereby, joint processing is possible even when only a small amount of information is available.

The method of Ohtani also comprises a handover trigger signal involving a second base station: The handover trigger signal is communicated to the diversity handover trunk by way of a first base station. The method of Ohtani also includes receiving, by the mobile station, of the signals provided through the first and second transmission routes for combining the signals or choosing either one of the signals.

Hence, Ohtani discloses two transmission routes that limit the forwarding of information to mobile stations by way of base stations only. However, according to yet another aspect of the present invention, it would be advantageous to provide for cooperation between the base stations and to combine information.

In addition, Ohtani teaches another limitation, where the mobile stations provide a handover trigger signal, involving the second base station, to the diversity handover trunk by way of the first base station. According to an aspect of the present invention, it would be beneficial to waive the need for a handover trigger signal while still providing combination of information.

Moreover, Ohtani divulges that the combination of signals requires handover, which is another limitation, not required according to an aspect of the present invention. Yet more, Ohtani does not recite the advantages of a joint processor configured such that one active link is used to provide side information for a second active link.

In contrast to Ohtani, but according to an aspect of the present invention, the two links helping technique allow use of the joint signal processor between base stations, network nodes, and mobile stations, which is advantageous.

Ohtani further discloses changing the delay time in the first transmission route into the second delay time; transmitting, the signal directed to the mobile station, through both of the first and second transmission routes; and receiving, by the mobile station, the signals provided through the first and second transmission routes for combining the signals or choosing either of the signals. In contrast, in another aspect of the present invention, there exists combination of local beamforming with space-time coding over several base stations.

U.S. Pat. No. 6,711,409 B1 to Zavgren Jr. et. al., referred as Zavgren hereinbelow, teaches a cluster member that can forward data, or communicate through, any of its currently affiliated cluster heads. The cluster member can also determine the optimum path for delivering a particular message. Hence, Zavgren discloses relaying, which includes relaying standard packets and signaling (control) packets. However, it would be advantageous to remove the limitation of the type of information that is relayed. According to an aspect of the present invention, the type of information that is relayed is not a simple packet as with Zavgren, but is a result of joint signal processing to be relayed to another network node.

U.S. Pat. No. 6,493,759 to Passman et. al., referred as Passman hereinbelow, teaches a procedure that minimizes data loss in a communication network having member stations arranged in clusters, with each cluster having a head station. Passman thus discloses a network of member stations that communicate messages among themselves, similar to the known Internet. Hence, Passman recites homogenous networks, where a cluster head station is just another node selected out of a collection of nodes.

Furthermore, Passman discloses that depending on mobility changes of stations in a mobile network, new clusters form and cluster heads emerge as stations move around, which means reference to a mobile ad hoc clustering, where the entire network is basically wireless with mobile nodes.

In addition, Passman teaches a mobile communications station which communicates among a plurality of mobile stations in a network. Stations within the network are arranged in clusters of communication member stations, with one member station in each cluster being a head station for the cluster. Each member station communicates with the network through one or more cluster head stations. The cluster head stations communicate with other cluster head stations. The mobile station includes a transceiver that transmits signals to and receives signals from mobile stations in the network.

Hence, Passman discloses that each station in the network is a mobile station that can transmit and receive signals from all other mobile stations and that stations within the network are arranged in clusters of communication member stations. One member station in each cluster is a head station for a cluster. Each member station communicates with the network through one or more cluster head stations. Passman thus discloses a technique for clustering a general wireless network However, neither Budin, nor Budin in view of Passman, disclose, teach, or suggest the notion of a cluster of base stations for clustering a general wireless network, which is not equivalent to base station clusters. According to one aspect of the present invention, this notion is in contrast with the advantages of a way for the network operator to efficiently implement a cellular deployment, with a master base station and a slave base station, and not just a clustering technique to arrange the nodes in the network into clusters.

It is noted that neither Budin, nor Budin in view of Passman, disclose, teach, or suggest any method for handover or other similar technique. Therefore, according to an aspect of the present invention, it would be beneficial to configure the master base station to manage the active links within a cluster, to thereby provide transparent handover within the cluster.

It is yet further noted that neither Budin, nor Budin in view of Passman, disclose, teach, or suggest a technique for providing a virtual cluster, so that no external station is able to identify the operation of a cluster. Thereby, clusters may be defined by a network operator without notifying the served stations. Hence, according to an aspect of the present invention it would be of advantage to provide a cluster that is configured with a single base station address, to thereby appear externally as a single base station.

It is still further noted that neither Budin, nor Budin in view of Passman, disclose, teach, or suggest a means for a cluster of base stations to have the same address, so that the served mobile stations will be unaware of the existence of the cluster. Such means allow the use of mobile stations that are not built for being served by a cluster of base stations to be transparently served by such a cluster. According to an aspect of the present invention, it would be of advantage to provide means to cluster the base stations into slave base stations and a master base station, with the downlink being controlled by the master base station, and each base station in the cluster having a same address such that collaboration within the cluster is transparent.

U.S. Pat. No. 6,801,571 to Hyziak et al., referred as Hyziak hereinbelow, teaches data compression for wireless digital access systems. In other words, compression as recited by Hyziak is limited to the compression of user data. This is evident by the disclosure of Hyziak of V.42bis, which is a compression protocol that uses the Lempel-Ziv algorithm for compression. Such an algorithm is relevant only to non-random data, which originates from user sources, such as files, picture, and voice data. User data is lower rate data originating from users, in contrast with signals that originate from the system itself, are not compressible via a Lempel-Ziv algorithm or its equivalents, and do not depend on the specific data traffic.

It is noted that neither Budin, nor Budin in view of Hyziak, disclose, teach, or suggest any means for compression of the physically received signals, in contrast with user data. It would therefore be advantageous to provide means wherein joint signal processing comprises joint signal compression of received signals according to an aspect of the present invention. In other words, means that may receive (send) the signal in any event, to process the signal as main and helper nodes.

It is further noted that neither Budin, nor Budin in view of Hyziak, disclose, teach, or suggest any means wherein one of the base stations is a helping base station, and wherein at least one of the received signal compression and error correcting coding are jointly performed on a received signal, prior to forwarding to a destination node. However, such advantageous means are recited according to an aspect of the present invention.

It is still further noted that neither Budin, nor Budin in view of Hyziak, disclose, teach, or suggest any means wherein joint processing comprises jointly received signal compression, according to an aspect of the present invention.

The teachings of Budin in view of Passman and further in view of Zavgren, do not disclose, teach, or suggest any means wherein each base station in a cluster is configured to decode uplink information of all mobile stations which are clients of the cluster. Each base station is able to decode, and forward resulting observations directly to the access server gateway or to the master base station, the master base station being configured to decode remaining undecoded information by combining respective resulting observations. However, such advantageous means are recited according to an aspect of the present invention. In other words, these means permit the base-station to combine, by joint signal processing of information, of undecoded relayed information with the knowledge of the physical locations of the base stations to decode the transmission of the mobile stations (clients). In the disclosure of Zavgren and of Passman, every serving node provides on its own for decoding of the transmission intended thereto, and there is no relaying before decoding.

Furthermore, the teachings of Budin in view of Passman and further in view of Zavgren, do not disclose, teach, or suggest any means wherein at least some of the signals forwarded to the master base station are routed via an intermediate base station or via a backhaul channel. This means that even if taken together, Budin, Passman and Zavgren do not disclose, teach, or suggest that the relay of joint signal processing may be achieved indirectly, via another relay, as via an intermediate base-station, or via a backhaul channel, as disclosed according to an aspect of the present invention. In the teachings of Zavgren and of Passman, every serving node decodes on its own the transmission intended thereto, and thus forwarding consists of relaying only data messages. Passman recites that preferably, each mobile station can select an optimum route (e.g., a route with the "lowest cost") to transmit messages throughout the network and Zavgren discloses a cluster member can forward data, or communicate through, any of its currently affiliated cluster heads. The cluster member can also determine the optimum path for delivering a particular message.

U.S. Pat. No. 6,477,380 to Uehara et. al., referred as Uehara hereinbelow, teaches a plurality of base stations that transmit and receive a frame to/from the mobile station. A manage station unifies the plurality of base stations. The manage station comprises an estimating circuit which estimates the location of the mobile station based upon a plurality of locations of the plurality of base stations, and a plurality of distances separating between the plurality of base stations and the mobile station. Uehara clearly recites that the location estimation is based on individual distances between each of the base station to the mobile station.

However, the teachings of Budin in view of Passman, Zavgren, and Uehara do not disclose, teach, or suggest any means wherein the system is configured with a location estimator for estimating the location of a given mobile station based on the combination of respective resulting observations. Such means are beneficial and are recited according to an aspect of the present invention, where the location estimation mechanism uses the combined information received from all the base stations, and is therefore much more accurate than the location based technique disclosed by Uehara.

SUMMARY OF THE INVENTION

In the disclosed invention, a cellular architecture which allows continuous utilization of macro diversity gains, within clusters of BSs is described, where the complexity is kept small by using clustering.

In the following the term "network node" includes any kind of transmission hub or base station, and is to be understood accordingly.

According to one aspect of the present invention there is provided a wireless network system comprising:

a plurality of network nodes, or base stations each configured to manage active links to mobile stations within a range; and a controller configured to control said base stations to provide at least two active links from at least two different base stations simultaneously to a given mobile station in integral manner for joint processing.

In an embodiment, one of said active links is a main link and others of said active links are helper links.

In an embodiment, said controller comprises a joint processing unit to jointly process said two active links to decode transmissions of said mobile station.

In an embodiment, said joint processor is configured such that one of said active links is used to provide side information for a second of said active links.

In an embodiment, said controller comprises a joint signal processing unit to jointly process said two active links to decode transmissions of said mobile station, and said joint signal processing unit is configured such that one of said active links is used to provide side information for a second of said active links.

In an embodiment, a first of said base stations is configured to provide joint processing of a respective helping link and to forward a result thereof to a second of said base stations for further joint processing with a respective active link thereat.

An embodiment may comprise three network nodes with helping links to said mobile station, and wherein said controller comprises a joint signal processing unit to jointly process said two active links to decode transmissions of said mobile station, and said controller is configured to transfer joint signal processing results from two of said base stations to a third of said network nodes for a further joint processing result with the respective active link of said third network node.

An embodiment may comprise three network nodes with links to said mobile station, and wherein said controller comprises a joint signal processing unit to jointly process said two active links to decode transmissions of said mobile station, and said controller is configured to pass a joint processing result of a first of said network nodes to each of a second and third of said network nodes for further joint signal processing with the respective active links thereat.

An embodiment may comprise a relay for relaying joint processing results between respective base stations.

In an embodiment, said network nodes are base stations, and one of said base stations is configured as a master base station and at least one other of said base stations is configured as a slave base station, thereby to form a base station cluster.

In an embodiment, said master base station is configured to manage said active links within said cluster, thereby to provide transparent handover within said cluster.

In an embodiment, said cluster is configured with a single base station address to appear externally as a single base station.

In an embodiment, each base station in said cluster is configured to decode uplink information of all mobile stations which are clients of said cluster, where each base station is able to decode and forward resulting observations directly to the access server gateway or to the master base station, and the master base station is configured to decode remaining undecoded information by combining respective resulting observations.

An embodiment may be configured with a location estimator for estimating location of a given mobile station based on said combining of respective resulting observations.

In an embodiment, at least some of said forwarding to said master base station is forwarded either via an intermediate base station or via a backhaul channel.

In an embodiment, said links comprise uplinks and downlinks.

In an embodiment, said joint signal processing comprises joint compression of received signals.

In an embodiment, said joint signal processing comprises error correction decoding.

In an embodiment, clustering of base stations is carried out dynamically.

In an embodiment, one of said base stations is a helping base station, and wherein at least one of received signal compression and error correcting coding are jointly performed on a received signal, prior to forwarding to a destination node.

According to a second aspect of the present invention there is provided a method for wireless networking comprising:

providing a plurality of base stations to manage active links to mobile stations within a range; and controlling said base stations to provide at least two active links from two different base stations simultaneously to a given mobile station in integral manner for joint signal processing.

In an embodiment, said joint signal processing comprises joint received signal compression.

In an embodiment, the active links are downlinks, for downlink collaboration, and wherein the base stations are arranged in clusters, the active links being transmitted from base stations of a same cluster, the method comprising each of said base stations separately performing beamforming, the base stations applying a space-time coding permutation between themselves.

In an embodiment, the active links are downlinks, for downlink collaboration, and wherein the base stations are arranged in clusters, the active links being transmitted from base stations of a same cluster, the method comprising each of said base stations separately using a respectively different cyclic shift delay in downlink OFDM, to thereby avoid unintentional beamforming In an embodiment, the base stations are clustered into slave base stations and a master base station, said downlink being controlled by the master base station, each base station in the cluster having a same address such that collaboration within the cluster is transparent.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system, or by using firmware. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. The present embodiments typically work on a network. A display and/or a user input device such as a keyboard or mouse are optionally provided as well for system programming as necessary.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
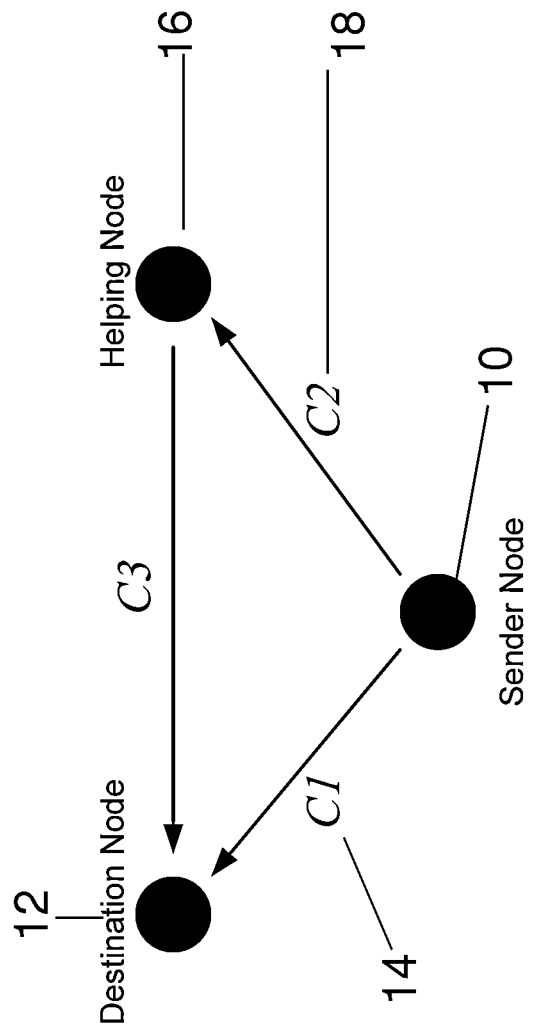
FIG. 1 illustrates an exemplary communication network, which may be part of a communications system, implemented in accordance with the present invention.

The present embodiments make use of the principle that a mobile station is generally within range of more than one base station at any given time, and allows the different base stations or nodes, which may receive (send) the signal in any event, to process the signal as main and helper nodes.

In an embodiment a group of such nodes work together as a cluster with a master base station and slave base stations, all controllable together to best serve the mobile station.

Some embodiments are directed to methods and apparatus for efficient processing at destination and helping nodes of a wireless network, which will better utilize the network resources, whether wireless, fiber-optic or otherwise, by considering that the channel between destination and helping nodes is not a noiseless channel, and is susceptible to physical conditions, which in turn induce errors.

In accordance with the present teaching, a helping node may process the received signal by using a digital conversion mechanism, and then use a single encoding process on the bit stream, for both error correcting (ECC) and compression.

A destination node may use the present teaching by jointly processing (decoding) the locally received signal and the locally available side information to decode the message from a helping node.

In various embodiments, a single procedure, or several linked procedures, is used at the destination node to both correct errors induced by the channel between helping node and destination node and also to save network resources by using the locally available side information.

In one particular embodiment, the helping node converts the received signal to bit stream via a conventional processing chain (including for example low-pass filters, channel estimation, local maximal ratio combining) and then uses a convolution encoder, regardless of the code used by the client's transmitter. The destination node then uses a single Viterbi decoder with inputs from the locally received signal from the sender node and helping node. This enables the destination node to decode the message from the helping node even when the channel between the destination and the helping node is very poor, and then to use the information from the helping node to process the signal from the sender node, with lower error probability.

In various embodiments of the present invention, different error correcting codes are used, such as Turbo, LDPC, IRA, Raptor, convolution, Reed-Solomon.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic diagram illustrating the relationship between different nodes when used in the configurations of the present invention. A sender node 10, say a mobile station, wishes to transmit a message to a destination node 12, through the channel C1, 14. The transmission is received also by a helping node 16, through the channel C2, 18, which may receive the transmission meant to be transmitted on C1. This reception is processed according to the present teaching, by jointly compressing and channel encoding the information, before transmitting a corresponding message via channel C3, 20, to the destination node 12. The channel encoding enables the destination to recover errors caused by C3. The joint processing allows the helping node 16 to transmit the compressed and encoded message to the channel without long delays. The destination node 12 receives from both the sending and helping nodes, and may decode and decompress the sent message from the helping node by also using the received signal from the sender node on channel C1, 14, as side information. According to the present teaching, joint decompressing and channel decoding may save significant realization complexity.

Joint processing may involve performing compression and error correcting coding jointly on a received signal. Then a resulting output is transmitted to the destination node. The destination node jointly processes the received signal from the helping node with locally received side information to decode the message from the helping node.

The said received signal at the helping node and the local side information at the destination node are noisy versions of an original message from a sending node—the mobile station.

Reception of the helping and destination nodes is typically over a wireless channel, such as wireless WiFi, WiMAX, CDMA, UMB, UMTS-LTE, Zig-Bee, etc.

The reception of the helping node may alternatively be over wire-lines, such as coax cable or fiber-optic cables or the like.

There may be several sender nodes, and or several helping nodes, and or several destination nodes, each performing joint processing.

The joint processing may be a linear code, which can be low density parity check code (LDPC), irregular repeat accumulate (IRA) code, accumulate repeat accumulate code, Raptor code, LT codes, Turbo code, convolutional code, Reed-Solomon code, Reed-Muller code or any other linear code. Alternatively a non-linear code may be used.

Optimization may be performed on the joint signal processing, to ensure good performance. It will be appreciated that the joint signal processing may be divided into several components, but the overall joint signal processing may nevertheless be based on a single code.

Joint signal processing at the destination node may include error correction decoding at an error correction decoding unit.

In one embodiment, the received signal may be preprocessed into bit streams by a quantization technique before the joint signal compression and error correction coding at the said helping node, and before the joint processing at the said destination node.

It will be appreciated that the destination and helping nodes may be base stations of a wireless cellular system.

The said destination and helper nodes may additionally be wireless access gateways to other networks.

Received signals may be passed through relays or amplifiers or repeaters or other communication networks.

Processing may additionally involve power control, jitter control, buffering, channel measurements, delay estimation and correction, frequency correction, phase estimation, physical signal selection, adaptive modulation and coding.

Processing may be provided in layers by the helping and destination nodes, to provide adaptivity to noise. That is, when the signal received by the destination node is less noisy, the method at the destination node successfully processes more layers, and thus ends up with a higher quality observation of the helping node.

In an embodiment, several processing results performed by the helping node are simultaneously sent to the destination node by a single transmission which is composed of several signaling methods respectively. The signalling methods may be parallel transmission methods, such as multi-tone OFDM, or super-position coding. As the channel quality rises, more bits are detected from the received symbol. The channel quality is measured on both the side information and said helping-destination channel.

A feedback mechanism can be added from the destination to the helping nodes to specify the required channel parameters to which the helping node can adapt its transmission rate (which directly reflects the expected distortion of the helping node observation). Feedback can also be used between the joint decoder and decompressor and other preprocessing done at the said destination, or/and between the joint compressor and encoder and the preprocessing may then be carried out at the helping node. In this case the helping node may compute receive beamforming weights to be used for the local processing on the stage before compression.

An interleaver may be used within the helping node, and/or within the destination node, either before or after the joint signal processing.

An observation or message from the helping node may contain a minimal amount of information required for efficient joint processing with local observation.

Figure 2:
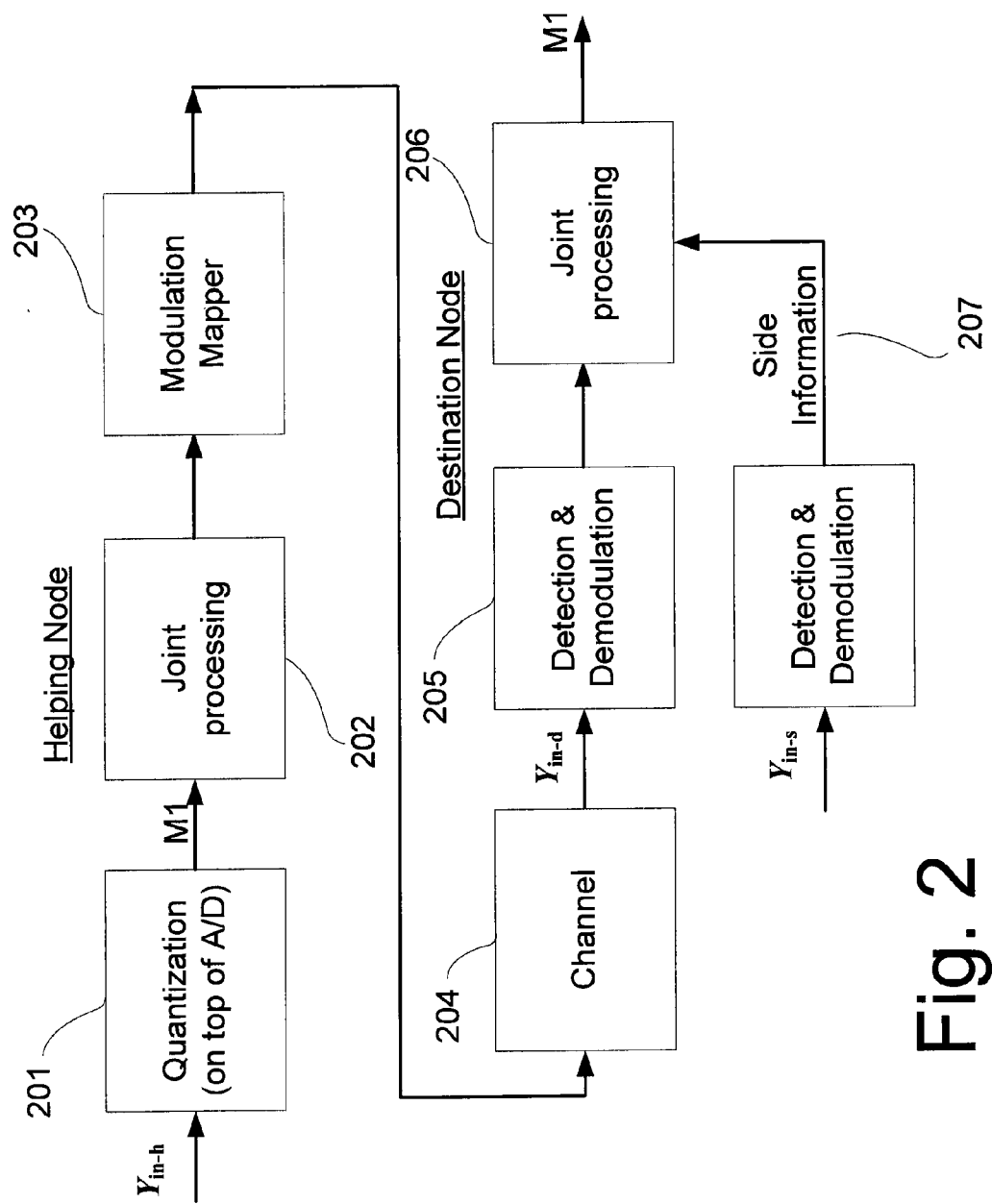
FIG. 2 illustrates an embodiment of the invention in which a helping node compresses its observation, sends to destination, and destination decompresses using its local observation. This is the first step before joint processing of the received signal at the helping and destination nodes.

Reference is now made to FIG. 2, which depicts an exemplary realization of the above-described teaching. The received signal at the helping node is $Y_{in-h}$. $Y_{in-h}$ is then processed by a scalar quantizer 201, which transforms a received analog signal ($Y_{in-h}$) into an efficient bit stream. The bit stream is forwarded to a joint processor 202, which according to the present teaching jointly compresses the bitstream and encodes the compressed message. The resulting message is then transmitted to a modulation mapper 203, which can modulate the bit stream from the joint processor into a modulated symbols sequence. Such symbols are OFDM, QPSK, QAM, M-PSK, among numerous others, commonly known to experts in the art. The modulation mapping may also be coupled with the joint processing such that less significant bits will get lower error protection, and the more significant bits will get the higher protection within the modulation. The above applies for example in multi-level constellations. The helping node then sends the resulting symbol to the channel 204. The channel 204 may be any form of physical, logical or other medium which causes errors in the transmitted message. The destination node receives both side information ($Y_{in-s}$) and channel output ($Y_{in-d}$), and uses demodulation and detection 205, in order to transform the received analog signal into a bit stream. According to the teaching, joint processor 206 uses both the signal from the helping node and a side information signal 207 in order to decode and decompress the message from the helping node (M1).

Figure 3:
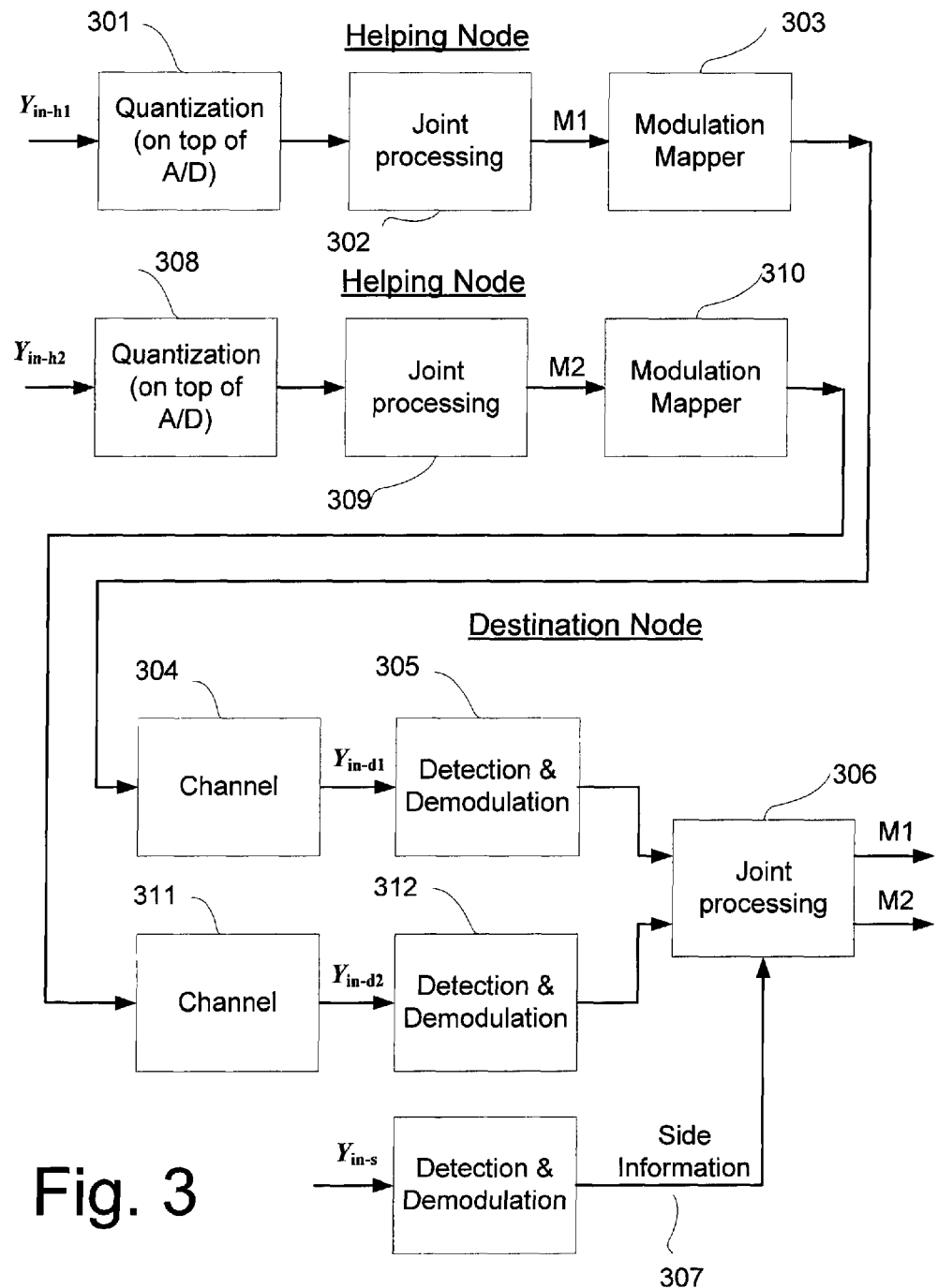
FIG. 3 illustrates an exemplary embodiment of the invention wherein several helping nodes are used in the network.

Reference is now made to FIG. 3, which is a simplified block diagram that depicts an exemplary realization of a network consisting of two helping nodes. The quantization 301 and 308 is done, as in FIG. 2 above, however here it is carried out by two helping nodes. Each helping node jointly compresses and encodes the compressed signals 302 and 309 and then transmits to the respective channel, 304 and 311, its own resulting signals, after modulating 310 and 303. The destination node can now use the side information 307 to jointly decode and uncompress the messages M1 and M2.

Figure 4:
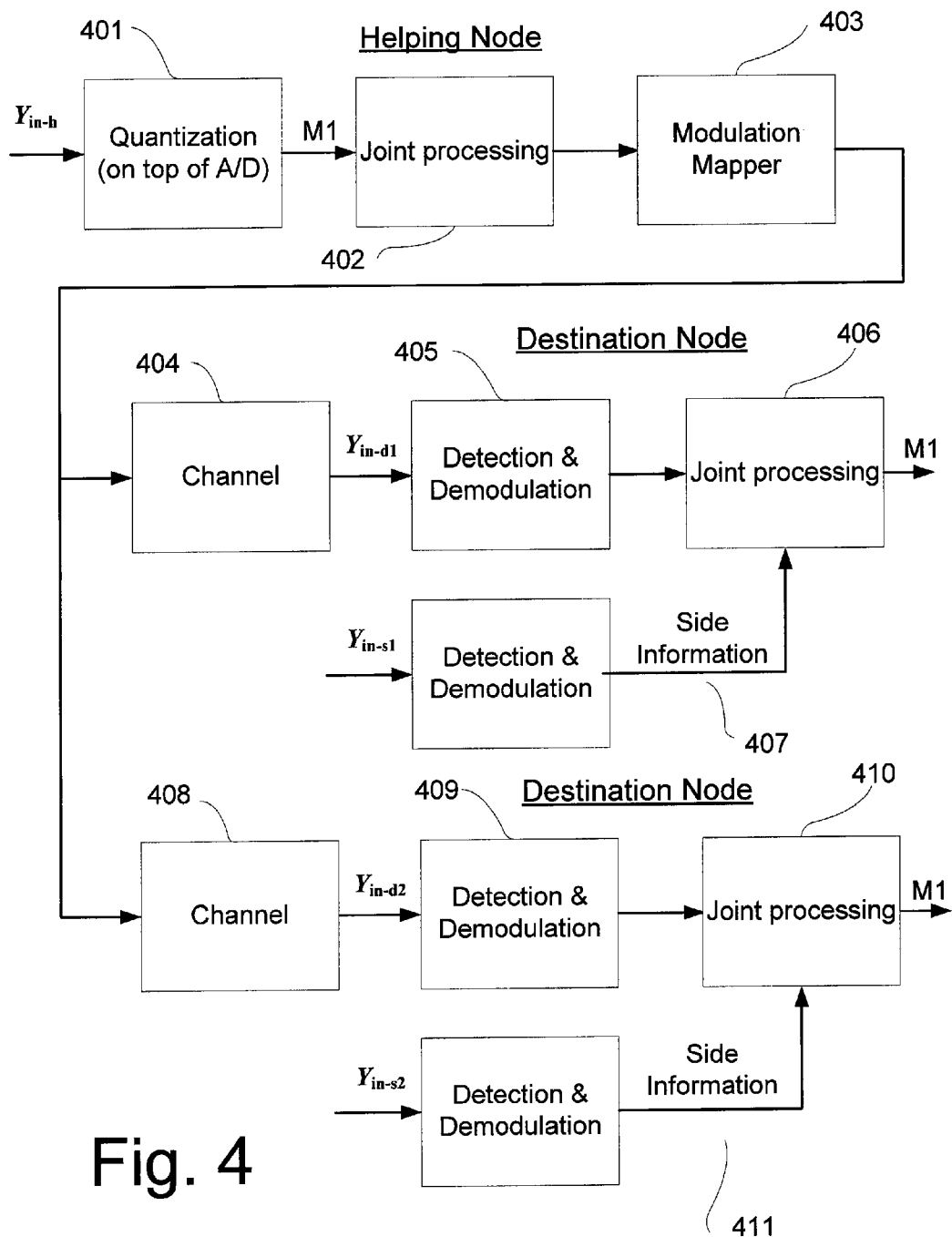
FIG. 4 illustrates an exemplary embodiment of the invention, wherein several destination nodes are used in the network.

FIG. 4 is a simplified block diagram which depicts an exemplary realization of a network consisting of two destination nodes and one helping node according to a further embodiment of the present invention. The helping node uses the same signal processing, joint signal processing 402, as when only one destination receives the message, in order to help both destination nodes. The helping node then sends the same resulting signal, following modulation mapper 403, to the two destination nodes, by either using the same channel, in a multicast or broadcast mode, or by sending the same signal in two different channels—404 and 408—as shown. Note that each destination may have different side information—$Y_{in-s1}$ and $Y_{in-s2}$ indicated by 407 and 411, which side information is used by the joint processing units 406 and 410 to produce the same message in the two distinct locations. An example of such a realization is when two sender nodes use the same frequency band, where one is received with high quality at one destination node, while the other is received with high quality at another destination node. On the other hand, the helping node receives the two sending nodes with equal quality, and sends its message to both destination nodes, which are both able to decode it, each using its own side information. Such a procedure may improve the wireless network capacity, by reducing the effect of inter-cell interference.

Figure 5:
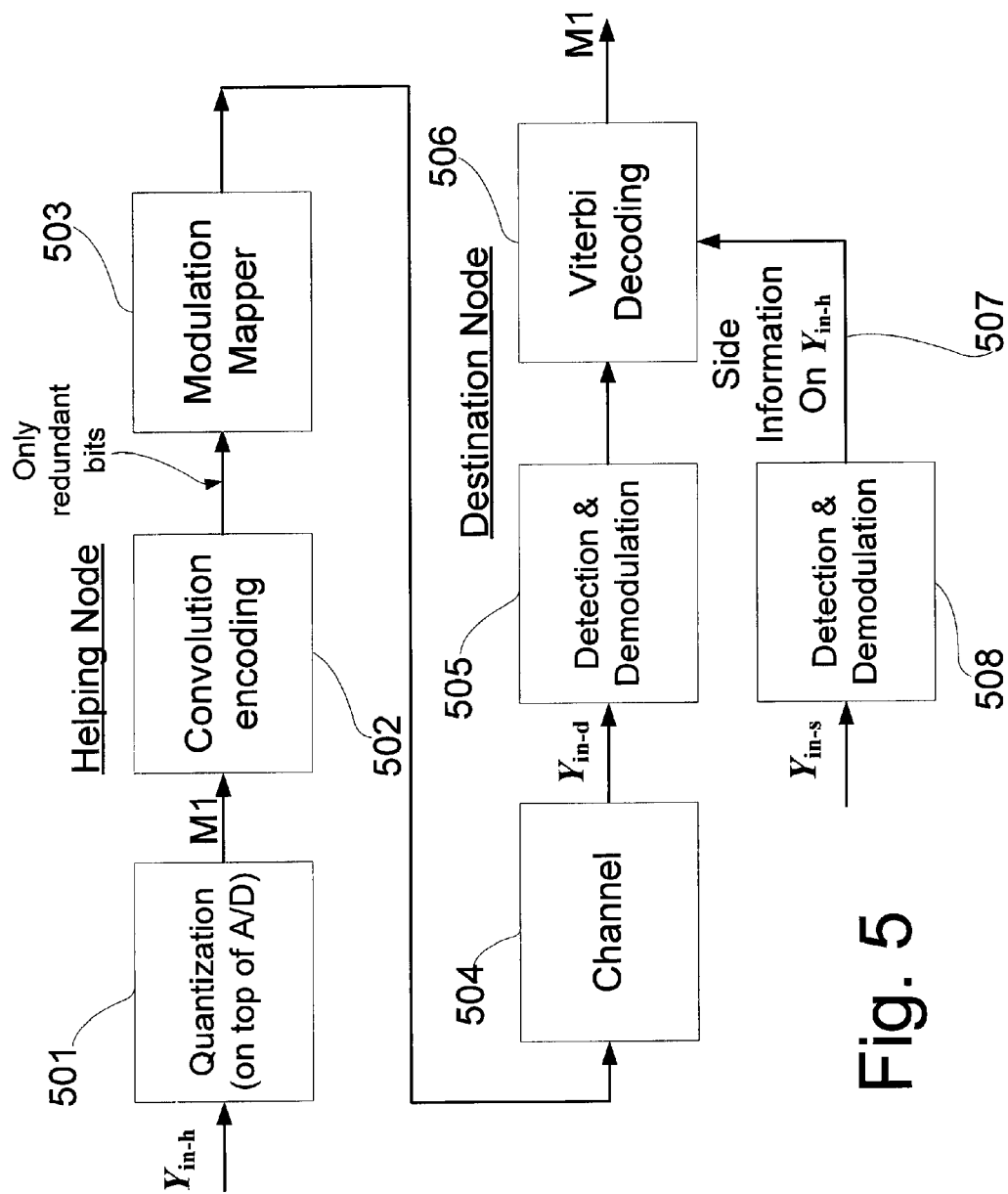
FIG. 5 illustrates an exemplary embodiment of the invention, wherein convolution code is used for the joint processing.

Reference is now made to FIG. 5, which is a simplified diagram that depicts an exemplary realization of the network, where the joint compression and encoding code used in the helping node is a convolution code 502. The joint signal processing unit itself includes a convolution encoder, and instead of sending the entire message, only redundant bits introduced by the code are forwarded into the modulation unit 503. Thus it is not necessarily the original bits of message M1 that go through the channel 504. Rather the redundancy bits are sent through the channel 504 and received by the destination node. The destination node then uses the Viterbi decoder 506, which corresponds to the convolution code used by the helping node. The inputs to the decoder are:

metrics for systematic information, through the side information 507.

metrics for the redundant bits through the channel reception ($Y_{in\text{-}d}$), after the demodulation 505.

In addition to a convolutional code with a corresponding Viterbi decoder, any other code can be used, including also optimization of the specific code, in terms of the specific parameters of the individual code ensemble.

Figure 6:
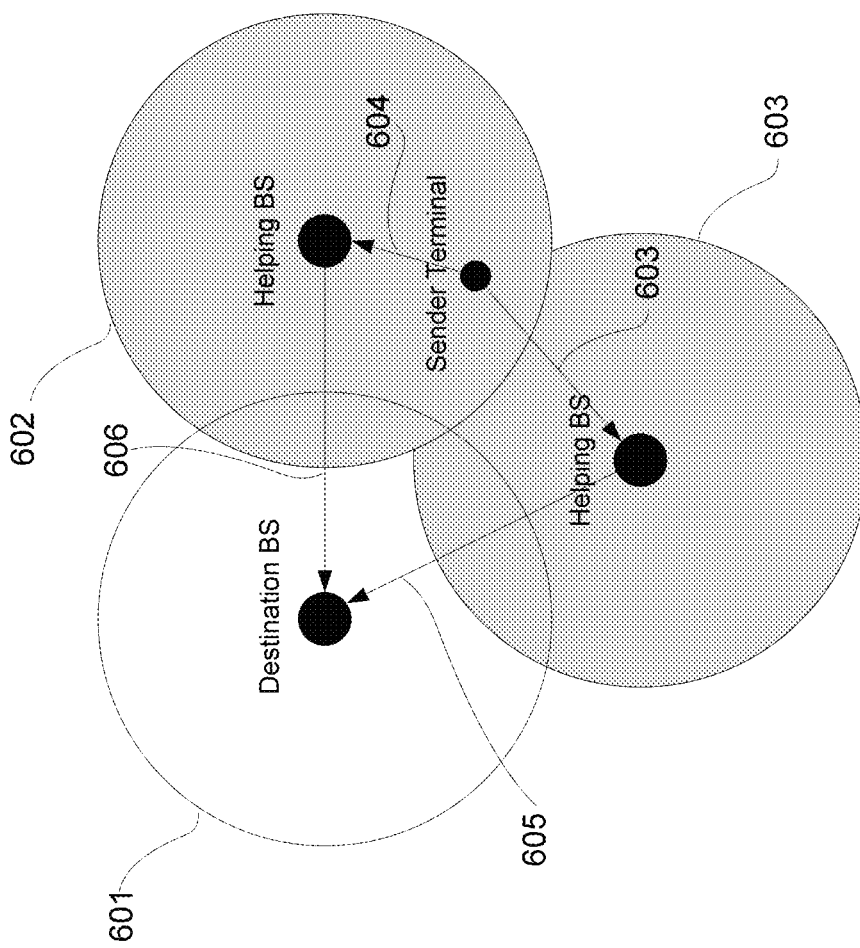
FIG. 6 illustrates a realization of the invention in a cellular wireless network.

FIG. 6 is a simplified diagram showing coverage of neighboring base stations in a wireless network, to which the above embodiments may be applied. According to this example, the sender terminal can be a handheld phone device, a laptop computer or any other mobile or fixed wireless device that is associated with the wireless network. The network is based on a plurality of base stations, where normally, every sending terminal uses an uplink channel to send information to the base station having the best reception. This means that the destination base station normally receives messages sent from sender nodes that are located within the defined cell 601. According to the present embodiments, the sender terminal can send a message to the destination BS, even though it is located beyond the boundary for favorable reception 601. This is achieved by helping BSs as described above, which also receive the signal, albeit more weakly but are still able to forward their own compressed and encoded reception of the sender's signal to the destination, through channels 605 and 606. The destination BS jointly performs decompressing and decoding of the signals from the two helping base stations, then uses these receptions to decode the original message from the sender node. This way the coverage area or cell associated with the destination BS is extended to include also the regions indicated by 603 and 604. The joint processing, for example, can for simplicity, use separate decoding of the helping messages, where each helping message is decoded using the same local side information. Another alternative example is also to do successive helping message decoding, start with the stronger one, then use its decoded message along with the local side information for decoding the other helping node message.

Figure 7:
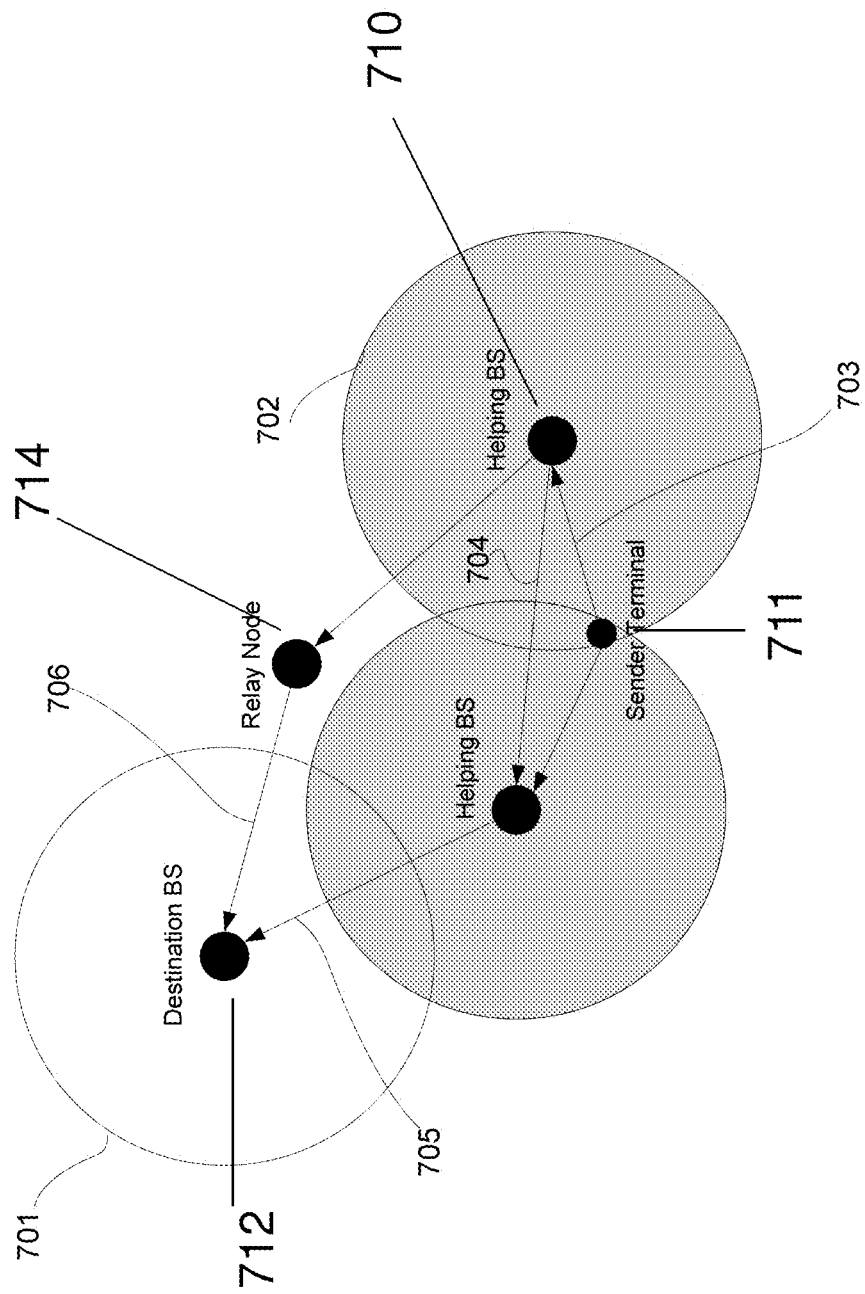
FIG. 7 illustrates an example of a realization of the invention wherein the helping node signal is being relayed to the destination node.

Reference is now made to FIG. 7, which is a simplified diagram of a wireless network, showing a variation of the scenario of FIG. 6. In the scenario of FIG. 7, a helping BS 710 may use another means of forwarding a signal from sender terminal 711, other than the channel used in the previous example. The rightmost helping BS 710 here is out of range of the destination base station 712 and so instead uses a relay node 714 to forward the compressed and encoded message to the destination BS 712. The relay then uses channel 706 to forward the message to the destination BS. This way, the coverage area of the destination BS 712 can be increased even beyond the possibilities presented by the scenario of FIG. 6, and furthermore, the use of relay nodes allows for application of the present embodiments to non-contiguous or disjointed areas.

Figure 8A:
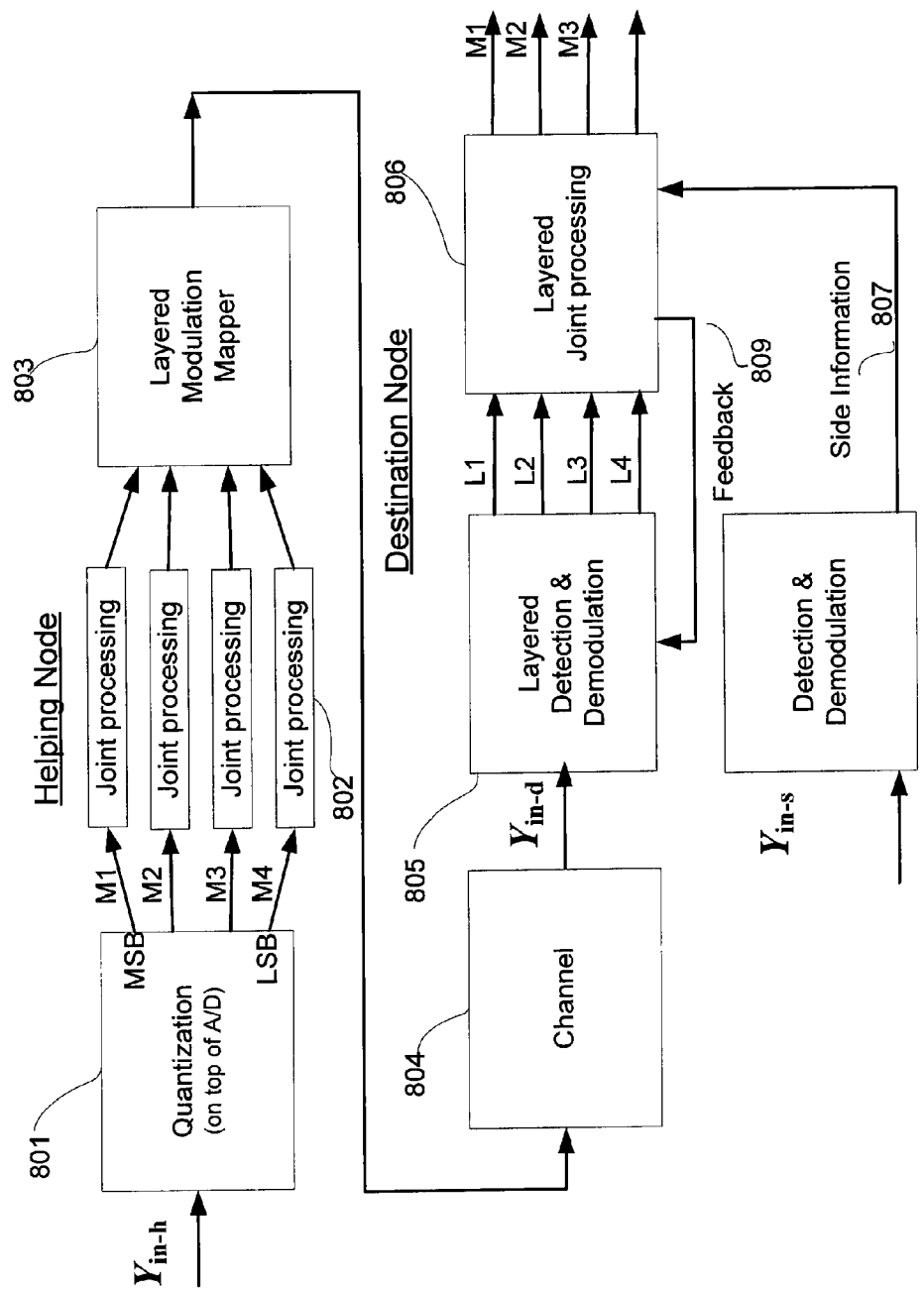
FIGS. 8A and 8B depict an exemplary realization of the invention, wherein a layered approach is demonstrated, such that as the helping-destination channel, or the side-information is better, the destination is able to decode more layers and get better compression from the helping node, while the helping node is unaware of the exact channel and/or side information quality.
Figure 8B:
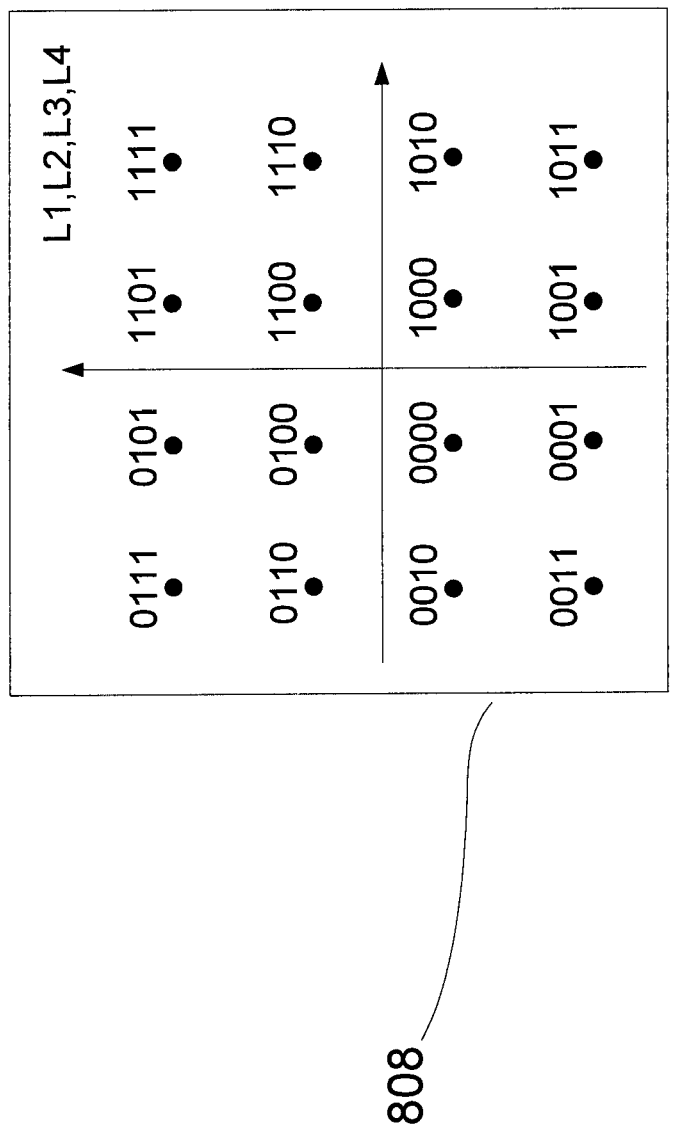

Reference is now made to FIG. 8A, which is a simplified block diagram showing an exemplary embodiment of the present invention. The input to the helping node ($Y_{in\text{-}h}$) is the same as in FIG. 2, where the quantization is such that the output is divided into several levels, where there are significant bits that represent higher signal strengths, most significant bits (MSB), and bits that represent lower signal strengths, least significant bits (LSB) and various levels in between. In the specific realization, the quantization uses four levels of quantization. Separately for each layer, the bit stream is jointly compressed and error correcting encoded by layerwise joint processing units 802. The encoded bit streams are then sent to a layered modulation mapper 803. The layered modulation mapper 803 maps each bit stream such that each bit stream is affected by different error probabilities. In this example, as seen in FIG. 8B, the four bit streams are modulated into a 16-QAM symbol 808, where the streams that are mapped to L1 and L2 in 808 enjoy the lowest probability of error, as compared to the streams that are mapped to L3 and L4 in 808. The symbol is then sent to the channel 804, and subsequently received by the destination node as $Y_{in\text{-}d}$. The received signal is then demodulated and per bit location, appropriate log likelihood ratios are calculated 805. Notice that some feedback 809 from the joint processing 806 may be fed back to the layered detection and modulation 805, so that the processing can be performed iteratively. The layered joint processing 806 may be performed for every quantization bit location separately, or jointly, using the dependency between the bits. As previously mentioned, the layered joint processing 803 may also provide a feedback signal 809 to the layered detection 805, so that several iterations can be carried out to improve on the initial preprocessing, by means of a MAP or successive detector, for example. The main advantage of using layers is that, depending on available side information at the joint signal processing 807 and the channel quality 804, the joint signal processing 807 can reliably decode only some of the bits. That is, the better the side information, or the higher the SNR at the destination, the more layers may be decoded, and a better quality of the helper observation may be available at the destination.

In the example of FIG. 8A, the decoder succeeds in decoding only M1, M2 and M3, and does not succeed in decoding M4. The transmission technique used by the helping node does not require prior knowledge of the available side information 807, or the channel 804 quality at the helping node, and its signal is adjusted to the actual conditions. As the channel quality improves and as the side information is better, the joint signal processor 806 may succeed in decoding more layers, or quantization bit locations. Both the layered transmission for quantization information and the addition of the joint processing, with or without feedback, are within the scope of the present embodiments. The approach is not limited to 16-QAM, and can be used also with other methods, for example, such as non-layered parallel channels (OFDM for example), dirty paper coding (DPC), plain efficient symbols, such as 16-PSK etc.

Another embodiment provides that both nodes calculate which bins within the received signal at the helping node are to be forwarded to the destination, and a method for that can be to take the helping node bins which globally have the highest signal to interference plus noise ratio. The forwarding of the selected bins can be done either directly (without compression) or by using the compression described in this embodiment of the invention, adhering to the side information at the destination.

Figure 9:
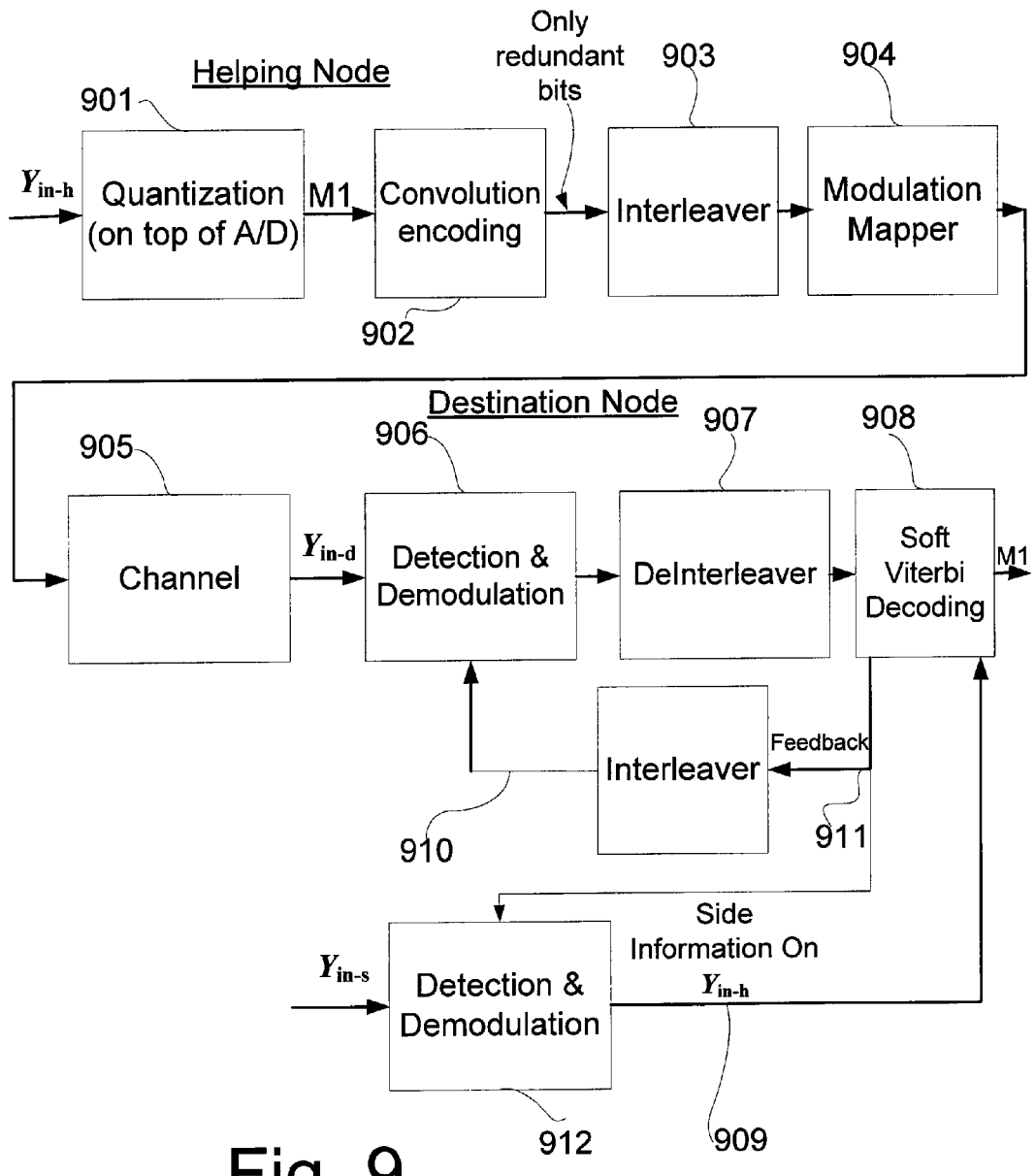
FIG. 9 depicts an exemplary realization of a system wherein an interleaver is used in the helping node, which allows the destination node to implement iterations between the decoding and the detection and thus improve the performance.

Reference is now made to FIG. 9, which is a simplified block diagram illustrating an exemplary realization of a system according to a further embodiment of the present invention. The helping node uses the same operation as described hereinabove with respect to FIG. 2, with the addition of the use of an interleaver 903 between the convolution encoder 902 and the modulation unit 904. The interleaver 903 is a unit which receives a bit stream at the input, and outputs a permutated version of the bit stream at the output, where the permutation can be either some structured permutation, or merely a pseudo random permutation based on a given memory length. The destination node uses the interleaver in order to use iterative processing. The detector 906 forwards the bit stream into a Deinterleaver 907, which does the inverse operation of the interleaver. This means that the inputs to the joint processor, which is a soft Viterbi decoder 908 in this example, are in the correct order, and M1 will be the same M1 as the one sent from the helping node. The Soft Viterbi decoder 908 is used instead of the standard Viterbi decoder 506 as per FIG. 5 above, in order to produce feedback information 911 into the detector 906, through an interleaver 910 and into the side information detector 912, in order to additionally improve the side information 909. By repeatedly sending information back and forth, the destination node is able to improve performance, while increasing the latency and system complexity, as the interleaver and the deinterleaver realizations usually require a fair amount of memory. The suggested feedback and the application of the feedback to the joint signal processor unit is within the scope of the present teaching.

Figure 10A:
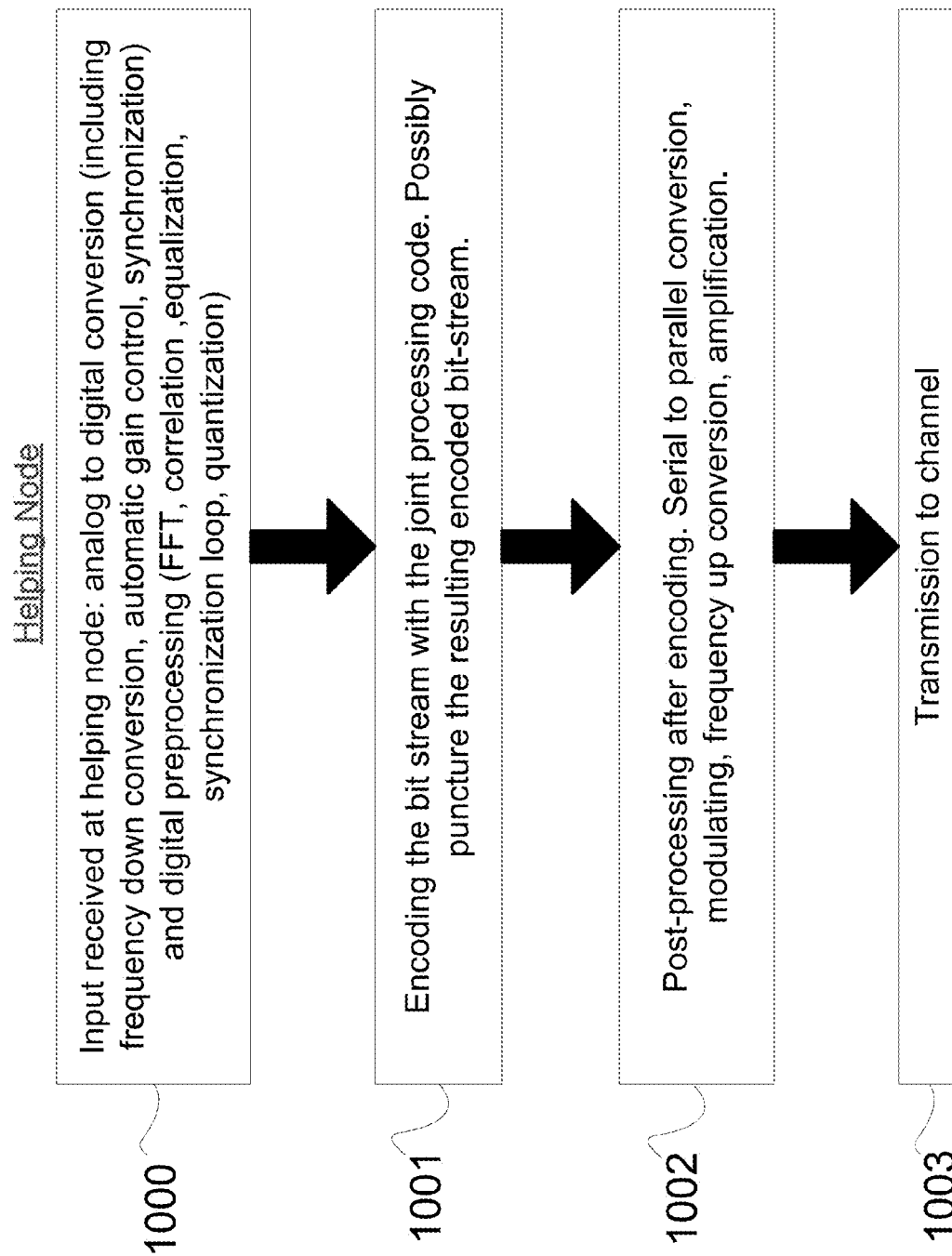
FIGS. 10A and 10B depict an example for the required functionalities at the helping node, according to an embodiment of the present invention

Reference is now made to FIG. 10A, which is a simplified flow chart showing an example of functional flow at the helping node. The first step 1000 is the reception of the signal, at some physical input device, the antenna and associated electronics, and then converting the received signal into digital format. Such conversion requires functions such as frequency down conversion, automatic gain control, synchronization etc. The digital signal is usually further preprocessed by functions such as Fast Fourier Transform (FFT), correlators, channel equalizers, more synchronization loops and also quantization. According to the present embodiments, the preprocessed bit stream is then transferred to the joint processor/encoder 1001, which encodes the received bit stream into another bit stream, according to a predetermined recipe called the code. It is common to use also puncturing procedures in modern codes, so that the code rate can be altered without the need the replace the code. The encoded bit stream is then further forwarded into a post processing unit 1002, which maps the bit stream into a series of symbols, such as QPSK, QAM, OFDM, etc. The symbol series is then frequency up-converted, amplified, and sent to the antenna/s, to be sent to the channel 1003.

Figure 10B:
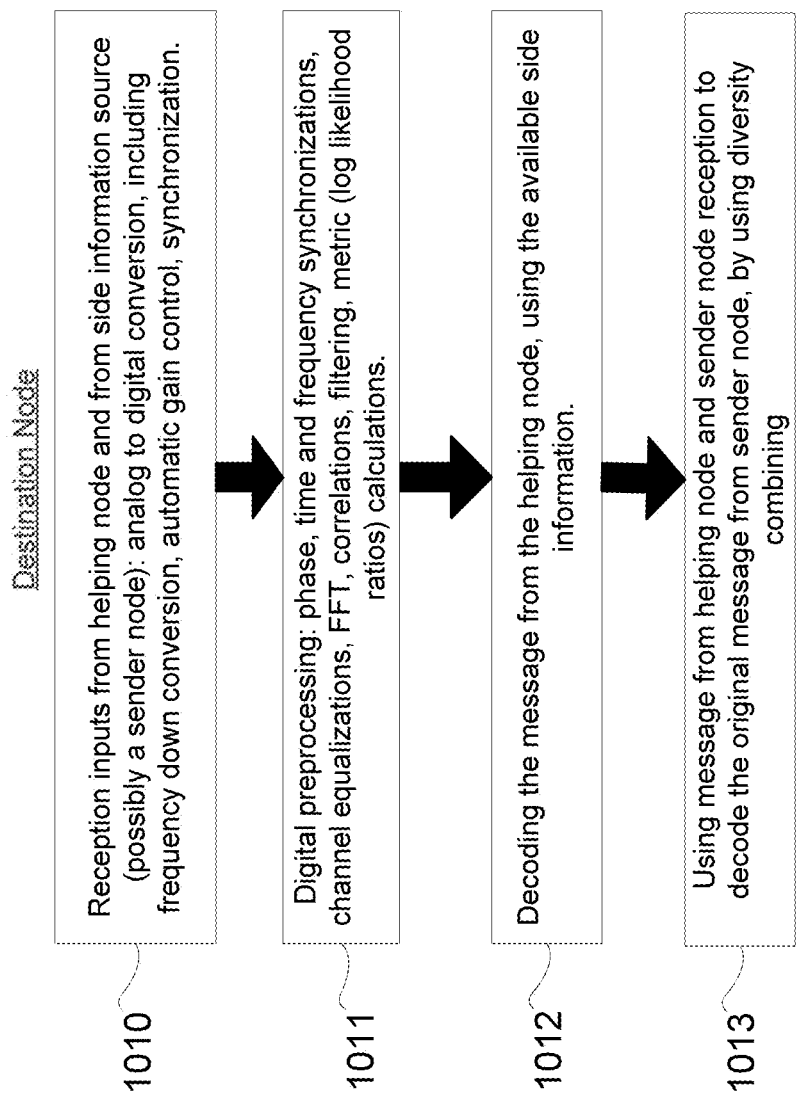

Reference is now made to FIG. 10B, which is a further flow chart to complete the flow chart of FIG. 10A, and which gives an example for the main functionalities in a destination node. As in FIG. 2 above, the received signals are transformed into a bit stream, but here two bit streams are received, one from the helping node, and one from the sender node, and each is processed separately. The bit stream from the analog to digital block 1010 is forwarded into a preprocessing unit 1011 which includes the functionality of 1010, with the addition of a metric or log likelihood ratios (LLR) calculation. The metric or LLR is transferred from both the side-information of the sending node and the side information of the helping node to the joint decoder 1012. The decoder then decodes the transmitted message from the helping node. This message can then be used, for example, for improving the quality of the locally received sender node signal, by for example diversity combining, so that the sender node's message is reliably decoded 1013.

Figure 11:
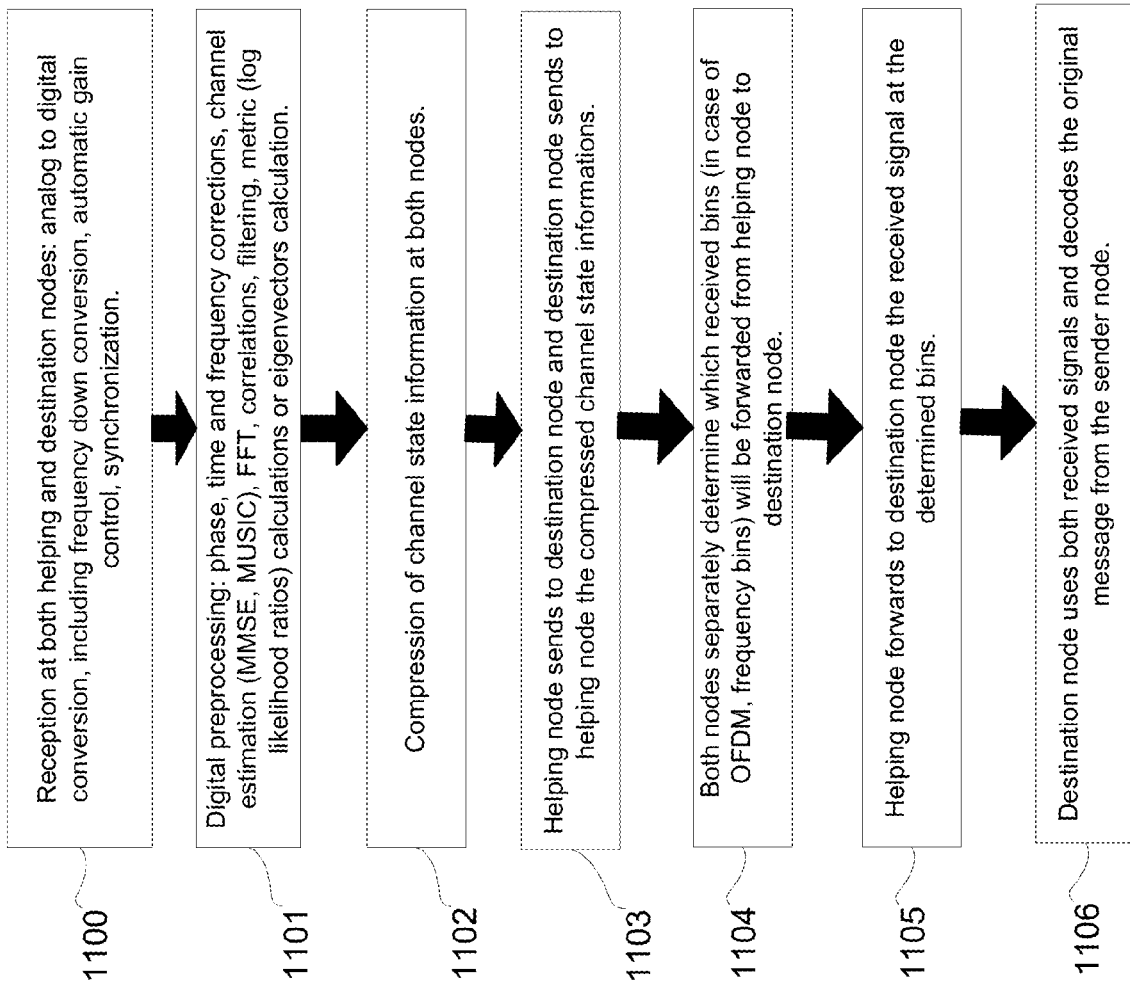
FIG. 11 illustrates uplink cooperative transmission using helper nodes, according to a preferred embodiment of the present invention.

An embodiment according to FIG. 11 includes a protocol for exchanging channel state information between the destination node and the helping node. Each node receives the signal which is transmitted via a different physical channel which can include multiple reflectors and multiple interferers (1100). Each node independently estimates the channel through which it receives the signal, by using some estimation procedure, for example the Minimum Mean Square Error (MMSE) or maximum-likelihood, etc., by using either/both preamble, training sequences and pilot symbols (1101) or/and also relying on the whole signal. Such estimation is performed also when there are more than one receiving antennas at the node, and there are also possible interferers.

Another embodiment of the first stage includes an estimation of the interferers that affect the reception at the helping node. Such a situation is expected when the transmission is performed in a license exempt band, or within a dense wireless network.

Another embodiment of the first stage includes exchange of the received training sequence part of the observations between the destination and helping node. This allows each side to compute the same local beamforming weights adhering to MMSE Wiener beamforming or MVDR beamforming. Both approaches are examples of beamformers which optimally combine the antennas and bins such that signal-to-interference-and noise (SINR) is maximized at the output of the beamformer.

The channel state information (H) are exchanged between the nodes, at the first stage of the protocol (1103). Each node then knows the channel state information of its own and of its neighboring node.

Another embodiment includes a compression of the channel state information by sending the signal in the time domain or in any other linear transformation. This way, the information will consist only of few strong components, which are the paths through which the signal traverses.

Another embodiment consists of the compression of the channel state information by an entropy compression, vector quantizer, scalar quantizer.

Another embodiment consists of sending information on the received interference sources, with possibly their direction and reception preamble or other form of identification.

At the next stage, both nodes calculate which bins within the received signal at the helping node are worth forwarding, 1104, for example, when the destination received the signal at some bin with strong channel state, the helping node will not forward the received signal within this bin.

Another embodiment of the present stage provides that both nodes calculate which bins within the received signal at the helping node are worth forwarding, 1104, for example, when the destination received the signal at some bin with strong channel state information and low interference, the helping node will not forward the received signal within this bin.

Another embodiment provides that the helping node sends the bins in which the interference at the destination is with the lowest correlation to the interference at the helping node, or alternatively the highest correlation, so that the destination could efficiently reduce the correlated interference.

Another embodiment provides that both nodes calculate which bins within the received signal at the helping node are worth forwarding, 1104, for example, when the destination has received the signal at some bin with strong channel state and the bin contains a received symbol with a more reliable encoding, for example, some bins can use a Binary Phase Shift Keying (BPSK), whereas other bins (weaker) can carry a 16 QAM symbol. So the helping node will not forward the received signal within bins with a BPSK signaling.

Another embodiment of the next stage provides that both nodes calculate which eigenvectors (or any other functional, such as Zero Forcing direction or beam direction) for each bin or for each group of bins within the received signal at the helping node, are worth forwarding, 1104. This is of use when a distributed space division multiple access (SDMA) or a reuse-1 cellular network or multiple interferences are employed, and when the helping node can use reception from more than a single antenna.

Another embodiment of the next stage concerns the case where both nodes calculate which bins within the received signal at the helping node are worth forwarding, 1104. For example, when the destination receives the signal at some bin with low estimation error, the helping node will not forward the received signal within this bin.

The helping node then sends to the destination the bins which were decided upon according to any of the above embodiments, or any combination of these.

Another embodiment concerns what is sent to the destination being further compressed by a scalar quantization, including possibly a dependency between the quantization level and the channel state, interference level, constellation used (QPSK, BPSK etc.) the code used (parity bits, systematic bits), eigenvector, estimation error, etc.

Another embodiment considers a vector quantization instead of scalar quantization.

Another embodiment concerns what is sent to the destination being further compressed using Wyner-Ziv coding guidelines, 1105.

Another embodiment includes a transmission of the channel state information or/and interferer information or any other statistical information on reception from the helping node and the destination node to each other. This scheme uses the fact that the channel does not change too rapidly along time, and so can use the dependency between frames of the information, and send only the difference between a current estimation and previous estimation. This way bandwidth can be further saved.

The destination node then decodes the received signal and combines it with its own received signal, via maximal ratio combining, for example, and then decodes the transmitted message from the sender node 1106.

Another embodiment includes a decision which is made only at the helping node, without any other information from the destination. This way, the helping node needs to decide which bins to forward using only its own observations. The helping node can choose to transmit only its strongest bins, which may be more useful for cooperation. The helping node may perform selection only, and may even perform compression after the selection. The present features may be combined with the other embodiments and features described hereinabove.

Figure 27:
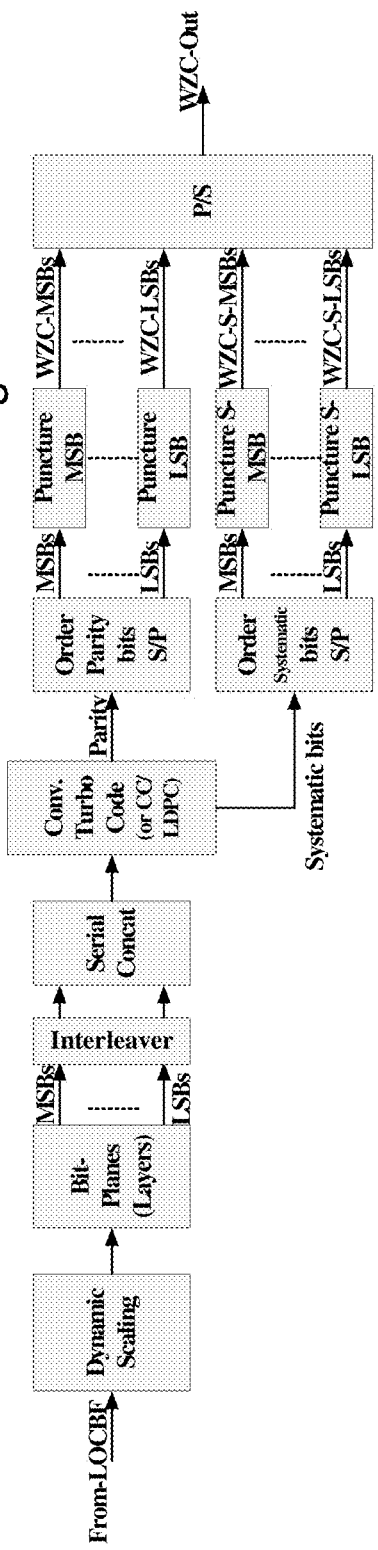
FIG. 27 is a simplified block diagram of a practical Wyner-Ziv (WZ) encoder for use at a helping node according to an embodiment of the present invention.

In another embodiment the compression at the helping node may include for example the building blocks described in reference to FIG. 27 hereinbelow. The input samples, after the (local) receive beamformer, form the input to the compression block, which is denoted 'From-LOCBF'. The input can be dynamically scaled in order to minimize the number of bits required per sample for the compressor input. The input bits can be split into separate input layers which correspond to bit-planes starting from the MSB down to the LSB per sample. When using a single encoder for the compressor, the concatenated bit-planes are interleaved and then fed as input to the encoder, which can be a Turbo or Convolutional or LDPC, etc. encoder. Since there is a different quality of side information for the MSBs and for LSBs a different puncturing pattern can be used for each plane at the output of the encoder, which can also be a particular puncturing for the systematic bits, and another pattern for the parity bits. This is clearly not mandatory; a simplified scheme may include a single puncturing pattern for the encoder output, and provide sufficient compression.

Figure 28:
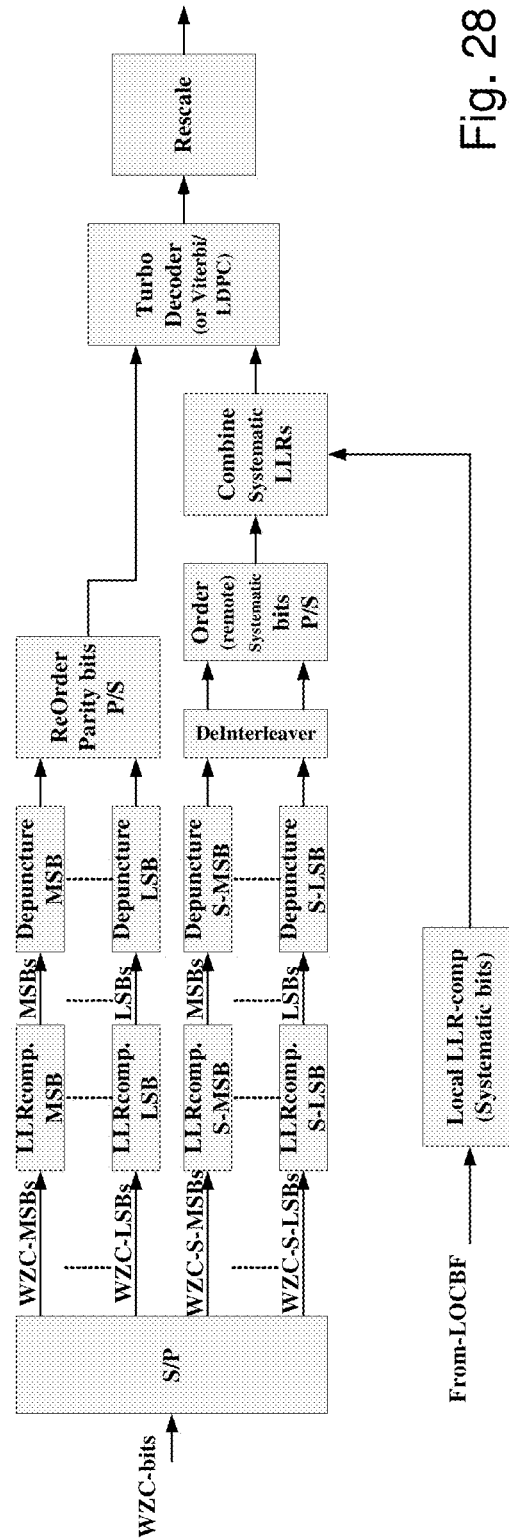
FIG. 28 is a simplified block diagram of a practical WZ decoder for use at a helping node according to an embodiment of the present invention.

A decompression block diagram for the exemplary encoder is given in FIG. 28. The first step in processing the compressed input is to provide log-likelihood ratios (LLRs) for the coded bits. In the compression scheme referred to above we described a compression which is not combined with a channel encoder, since the backhaul can also be a separate independent system. In this case the LLRs for the compressed input is simply computed with values corresponding to highest probability for the received bits. The depuncturing includes generating LLRs with value 0 (corresponding to probability 0.5) to the originally punctured bits. The local LLR computation block receives the local, or side, information of the destination node and computes the reliability per bit and per bit-plane of the received input, which is used for joint decompression. The decompression output bitstream is combined back into words describing the preprocessed observations of the helping node. This output is then used for further combining of the destination's preprocessed samples with the decompressed output.

Efficient Cluster Cellular Wireless Network Architecture

In the following, embodiments are considered in which neighboring base stations are organized into clusters, each cluster having a master base station and slave base stations. The clusters may appear to the outside world as a single base station with a single address.

In an alternative embodiment, the master-BS and slave-BSs which create the cluster may be identified as different cells, with different ID, such that hand-over between the BSs within the cluster is required. Such a configuration still enables collaboration on uplink and downlink as disclosed herein, as long as there is a central scheduling mechanism in the master-BS. This means that the collaboration gains which allow increased capacity and coverage is not limited to identical cells within a cluster. The gains may definitely be achieved even with a different identity per BS in the cluster.

The present teaching also allows efficient downlink using separate and distributed beamforming (in a TDD system) for extending coverage and increasing the capacity of downlink transmission. The form of separate beamforming refers to the case where two or more cooperating BSs gain channel side information from the uplink, and each BS computes its own beamforming weights for smart antenna downlink transmission. In separate downlink beamforming the BSs are not jointly calibrated, and may transmit with different phases. While not optimal, this approach may be more efficient than naïve omni-directional transmission. With distributed beamforming, a selected mechanism of phase calibration is required, and enables multi-BS coordinated transmission, for maximal downlink efficiency.

The downlink cooperative transmission illustrated in FIG. 11 can include for example efficient beamforming using separate or distributed beamforming, say in a TDD system for extending coverage and increasing the capacity of downlink transmission. Separate beamforming refers to the case where two or more cooperating BSs gain channel side information from the uplink, and each BS computes its own beamforming weights for smart antenna downlink transmission. In separate downlink beamforming the BSs are not jointly calibrated, and may transmit with different phases. While not optimal, this approach may be more efficient than naïve omni-directional transmission. With distributed beamforming, a phase calibration mechanism is required, and enables multi-BS coordinated transmission, for maximal downlink efficiency.

In the case that the BSs are fully synchronized OFMDA TDD systems with separate beamforming capabilities, a simple mechanism of identical cyclic shift delay on all antennas of the slave BS may be applied prior to a beamforming weight computation to prevent unintentional destructive separate beamforming of the master and slave BSs. Such a scheme will allow benefiting from the array gain of each BS in addition to diversity and power gains of the downlink, without having to perform distributed phase calibration.

In the case that the BSs are fully synchronized OFMDA TDD systems with separate beamforming capabilities, a simple mechanism like Alamouti Space-Time Coding (STC) among BSs can allow achieving full-diversity gains. In this scheme each BS performs beamforming of its stream, such that the STC streams are transmitted from separate BSs, and every BS beamforms a different stream (related to the STC). The mobile station, which needs to support STC, combines the two streams and achieves the full diversity gain between the BSs.

In many wireless technologies, a client node can maintain connectivity with more than one BS node. For example, in cellular systems a client node can communicate with all BSs within its range to negotiate a data/voice connection. This enables the BSs to hand over the client connection, without having to disconnect the client node from its original BS node. This is known as "soft handover" in a Code Division Multiple Access (CDMA)-based cellular network and in an IEEE802.16e WiMAX based wireless network, for example.

The teaching described herein enables a cellular network with improved efficiency, where uplink and downlink cooperative communication of multiple BS nodes with every client node (mobile station) is enabled. The basic idea here is to increase broadband spectral efficiency, which does not occur in soft handover, and in addition to maximize communication gains with uplink and downlink payload traffic which is continuously processed by multiple BS nodes. In order to obtain reasonable implementation complexity, the present teaching describes a central BS node, denoted as master-BS, and multiple slave-BSs, which include all other BSs within the cluster. The slave-BSs receive downlink data from the master-BS, on a frame by frame basis, and transmit on the downlink whatever is dictated by the master-BS. In the uplink direction, the slave BSs forward their preprocessed observations, which can be either fully decoded payload or partially processed payload, to the master BS. The master-BS uses its local received signal and the preprocessed input from the slave-BSs for efficient decoding.

The present teaching may be advantageous in its mobility support. As mentioned above, in one embodiment, within a cluster a client node views a single logical BS. That means no handover between BSs of a single cluster takes place. A client node can maintain continuous connectivity within a cluster while moving inside the cluster and switching between BSs. That is, when a client node is connected to a cluster, it is actually connected to the master BS node of the cluster. Therefore, when a mobile client node is received in high quality at one BS node and due to motion is later received in high quality by another BS node within the same cluster there is no actual hard handover, and continuous communications may take place since resources continue to be fully managed by the master-BS of the cluster. A cluster may communicate with other conventional BSs compliant with the cellular network, as the handover process between clusters is identical to handover between conventional BSs, and can be implemented following the cellular standard specifications.

Another aspect of the present teaching is that multi-BS communications as described by the methods and apparatus herein, enable increasing the link-budget. Multi-BS communications also make it easier to maintain reliable communications in variable channel conditions, and/or in case of interference, and/or when there is no line of sight (LOS) between a client node and a BS node. In such cases the BS nodes within a cluster cooperate to dynamically allocate resources so that efficient communications can be maintained with every client within the cluster. For example, when a client node is within the range of two slave BSs, the master-BS can send its payload to those two BSs, which cooperatively transmit on the downlink, and on the uplink forward their received signals to the master-BS to complete decoding.

The present teaching described herein suggests methods for increasing communication efficiency by multi-BS cooperation. As examples for downlink cooperation, BSs can synchronously transmit identical data, having the effect of increasing the order of the diversity. Also overall received power is increased. That is to say, the overall power is increased, as usually every BS node is limited in its maximal average transmission power due to environmental regulations such as those of the Federal Communications Commission (FCC). As an example, when two BSs transmit simultaneously identical data and each of them is independently limited, the overall transmission power is doubled, which implies also potentially double the received power on average. Such cooperation does not require any modification on the client node side, for which this cooperation is transparent.

Another example for cooperative downlink involves using one of the well known space-time coding (STC) techniques, referred to above, in a distributed manner. That is, the base stations may synchronously transmit multiple different data streams from different BSs. For example, two BSs may use Alamouti STC to maximize the diversity gain which adds to power gain described earlier, and together increase communications efficiency. For this type of cooperation the client node has to support the chosen STC, however the usage of multiple BSs instead of multiple antennas on the same BS is transparent for the client node and is advantageous in aspects of power and higher diversity gains. Other types of downlink cooperation may include MIMO communications of any type in a distributed manner, where the degrees of freedom are at least as high as the number of transmitting BSs and number of antennas on the client side. Such may potentially allow higher multiplexing gains than those achieved with a MIMO from a single BS, overcoming for example keyhole effects.

The teaching herein may also be advantageous in its efficient uplink communications which may include joint decoding using several BS nodes. Thus a diversity gain is obtained and overall link budget is increased. This can be translated to increased cellular coverage or/and to improved quality of service by increased achievable throughput. Higher efficiency of MIMO for uplink can also be gained since the distance between antennas, in the suggested distributed MIMO architecture, is as large as the distance between BSs, which introduces low correlation between antennas with high probability, eliminating keyhole effects, and also overcoming large scale fading effects.

The teaching described herein allows efficient communications with multiple clients. Examples of communication schemes with multiple clients include CDMA or orthogonal frequency division multiple access (OFDMA). In these types of communication, resources are shared between clients in every BS. The methods and apparatus of the present teaching enable centralized resource allocation at the master-BS node, and thus the resources allocated to each BS within a cluster depends on the load of a BS within the cluster. If for example one BS has many clients in its close surroundings, the master node may allocate a large portion of the resources to that BS at the expense of the resources allocated to other BSs. To exemplify this in OFDMA, the number of frequency sub-bands allocated for a BS can be dynamically controlled by the master BS node.

The teaching herein may also allow efficient downlink using separate and distributed beamforming (in a TDD system) for extending coverage and increasing the capacity of downlink transmission. The form of separate beamforming refers to the case where two (or more) cooperating BSs gain channel side information from the uplink, and each BS computes its own beamforming weights for smart antenna downlink transmission. In separate downlink beamforming the BSs are not jointly calibrated, and may transmit with different phases. While not optimal this approach may be more efficient than naïve omni-directional transmission. With distributed beamforming, a special mechanism of phase calibration is required, and enables multi-BS coordinated transmission, for maximal downlink efficiency.

Another advantageous feature is inter-cell interference reduction, which may be enabled in the cellular network cluster architecture. As explained above, the central BS node, i.e. the master BS, dynamically allocates resources for all its BSs within a cluster. Therefore, the resource allocation can be centrally and dynamically planned to reduce inter-cell interference within the cells of every cluster. For example, the master BS may avoid allocating common resources to adjacent cells, when no cooperation takes place.

Figure 12:
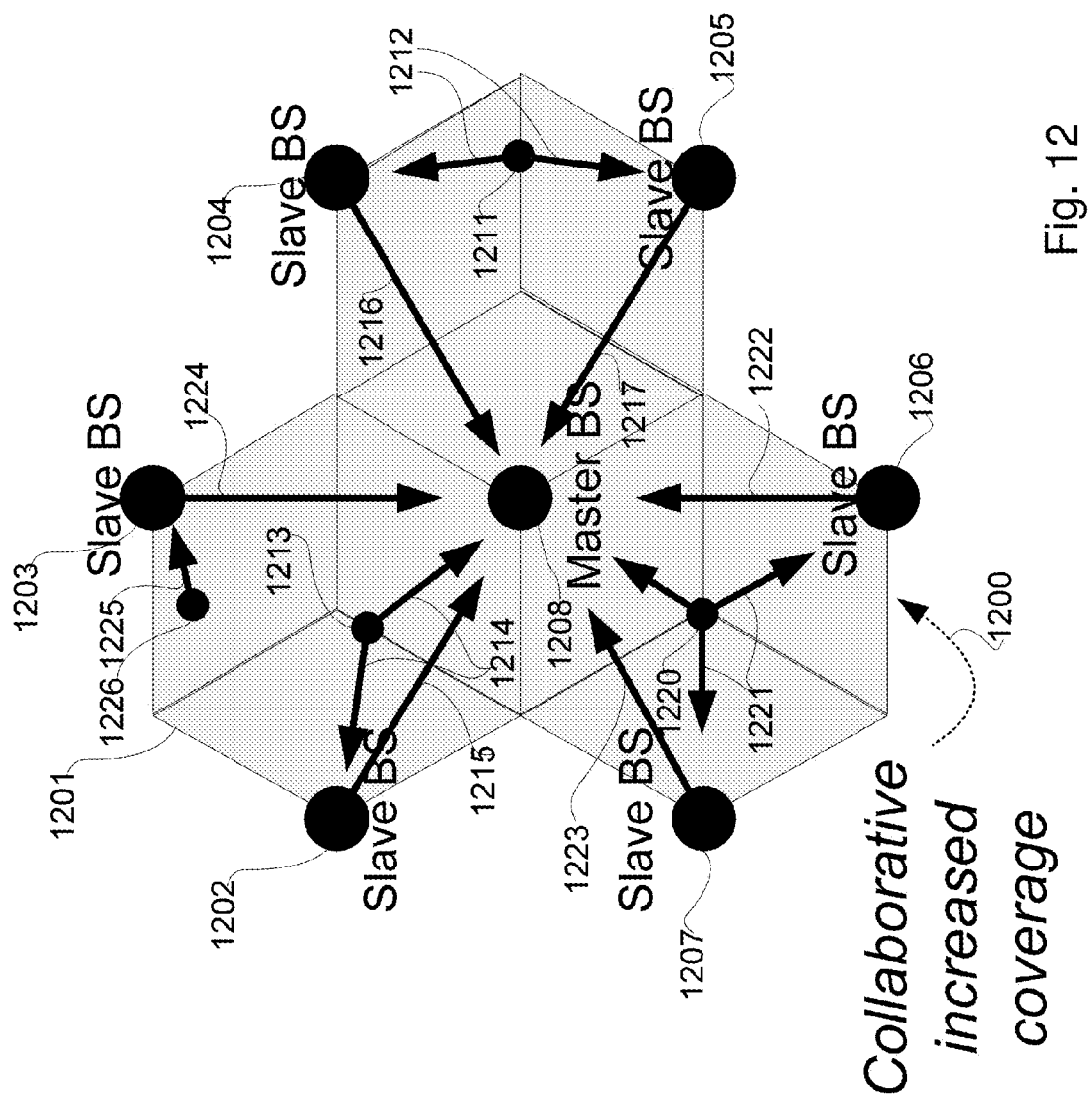
FIG. 12 is a network diagram illustrating the application of clustering according to an embodiment of the present invention to a network of base stations and showing uplink of two client nodes.

Reference is now made to FIG. 12, which illustrates an exemplary cellular network which includes seven BSs which create a cluster, 1202, 1203, 1204, 1205, 1206, 1207, and 1208. The central BS is 1208, also denoted as a master-BS, and it is the only BS in the figure which has to be connected to a backhaul infrastructure. The example includes sectorized BS configuration, where each sector, e.g. 1201 has 120 deg. coverage. There are a few exemplary client nodes within the illustrated cluster 1211, 1213, 1220, 1226. An exemplary uplink process is demonstrated through these clients. Client node 1213 transmits its uplink message 1214. Since the message is received in sufficiently high quality by slave-BS 1202 and master-BS 1208, both BSs receive a version of the message from client node 1213. The slave-BS 1202 and master-BS 1208 may or may not independently decode the message reliably. In the event that slave-BS 1202 decodes reliably alone, the slave BS transmits the decoded message to master-BS 1208. This transmission can be done by re-encoding at the slave for the slave-master channel, using the underlying backhaul or using other channels (link 1215), and the master need only use this new reception, disregarding the previously received signal. Another approach is to allow the master to combine or jointly process the two received versions, and thus reduce allocated system resources. This saves forwarding bandwidth with respect to transmission of soft metrics, as done otherwise. In the event that slave BS 1202 does not decode the message reliably it preprocesses the local observation of the client's 1213 message by means of synchronization, channel estimation, and then soft metrics to forward via 1215 to the master BS. This forwarding can be done, for example, by using joint source-channel encoding on the reception at the slave, and then decoding at the master using both received signals at the master, that is (links 1215 and 1214). Such an approach saves on bandwidth because of the information already known at the master, that is the reception of 1214, and on system complexity, because the joint processing is done within a single code. It is also possible to use two separated processes, that is source encoding (using side-information 1214 at master) and then channel encoding, for increased robustness. The link 1215 can be either a wireless link or a wired line. Furthermore, when 1215 is a wireless link it can use the access spectrum, which results in spectral reuse for forwarding messages from slaves to master BS. Another possibility is to use an orthogonal link in a different frequency range than that of the access spectrum, and thus potentially obtain higher throughput. The master BS may then performs coherent combining for increased diversity gains, which can enable reliable decoding in cases where this would otherwise not be possible. In case master BS 1208 decodes the message reliably separately from other BSs, the master-BS 1208 need not combine any more inputs with its local observation. The decoded message is required locally only at the master-BS 1208, since the master is connected to higher layer infrastructure equipment, such as backhaul.

Another exemplary uplink flow within the exemplary cluster 100, which appears in FIG. 12 is uplink transmission 1212 from client 1211, which is received by slave-BSs 1204, 1205, where it is received in sufficiently high quality. The slave-BS 1204 and slave-BS 1205 may or may not independently decode the message reliably. In case slave-BS 1204 or slave BS 1205 decode reliably alone, then the decoding BS may transmit the decoded message to master-BS 108. In case neither of slave BSs 1204, 1205 decode the message reliably, they preprocess their local observation of the client's 1211 message separately by means of synchronization, channel estimation, and then soft metrics. Each slave BS transmits its own preprocessing results via links 1216, 1217 to master BS 1208. The links 1216, and 1217 can be either wireless or a wire line. Furthermore, when 1216, 1217 are wireless links, they can use the access spectrum, which results in spectral reuse for forwarding messages from slaves to a master BS. Another possibility is to use orthogonal links in a different frequency range than that of the access spectrum. The master BS 1208 then performs coherent combining for increased diversity gains of its two inputs 1216, and 1217, which can enable reliable decoding. Before coherent combining, the master BS 1208 may use decoding on the signals sent form the slave BSs. This way the reliability of the suggested example network may be further increased. Such processing is also included within the scope of the present teaching. In case at least one of slave BSs 1204, 1205 forward a decoded message the master-BS need not combine the forwarded inputs. The possibility to use either decoding and then forwarding, or use preprocessing and then forwarding is also within the scope of the present teaching.

Another exemplary uplink flow within the cluster 1200, which appears in FIG. 12 is uplink transmission 1221 from client 1220, which is received by slave-BSs 1206, 1207, and master-BS 1208, where it is received in sufficiently high quality. The slave-BS 1206 and slave-BS 1207 may or may not independently decode the message reliably. In the case that either of slave-BS 1206 or slave BS 1207 decodes reliably alone, it forwards the decoded message to master-BS 1208. In case slave BSs 1206, 1207 do not decode the message reliably they preprocess their local observation of the client's 1220 message 1221 independently by means of synchronization, channel estimation, and then soft metrics. Each slave BS transmits its own preprocessing results via links 1216, 1217 to master BS 1208. The links 1222 and 1223 can be either wireless or a wired line. Furthermore, when 1222, 1223 are wireless links they can reuse the access spectrum. Another possibility is to use orthogonal links in a different frequency range than that of the access spectrum. The master BS 1208 performs coherent combining for increased diversity gains of its local observation and the two inputs 1222, and 1223, which can enable reliable decoding. In case at least one of slave BSs 1206 or 1207 has forwarded a decoded message, or the master-BS 1208 has decoded its local observation independently, the master-BS 1208 need not combine the forwarded inputs.

Another exemplary uplink flow within the exemplary cluster 1200, which appears in FIG. 12 is uplink transmission 1225 from client 1226, which is received by slave-BS 1203, and reception is of sufficiently high quality at this BS. The slave-BS 1203 independently decodes the message reliably, and forwards the message on relay link 1224 to master-BS 1208. The link 1224 can be either wireless or a wired line. Furthermore, when 1224 is a wireless link it can reuse the access spectrum. Another possibility is to use orthogonal links in a different frequency range than that of the access spectrum.

Any of the links 1215, 1223, 1224,1216,1217,1222, can use efficient techniques for forwarding the information by using the side-information which is available at the receiving node (decoder). This is demonstrated in FIG. 25, further discussed below, where the reception at the slave BS is first quantized 2501 and then encoded (by using efficient joint source-channel techniques or separated source and channel encoding) 2502 and then transmitted to the channel 2504 after adequate modulation and mapping 2503. The receiving end of channel 2504 then detects both side information 2507 reception, and original transmission 2505, and then uses for example joint decoding 2506 of both channel errors and quantization errors, or separately corrects channel errors, and then corrects quantization errors. The scheme can also skip the quantization stage altogether, and use only a single decoding procedure for decoding the original signal out of both receptions, while the encoding at the slave BS stays the same.

In case there is a failure to reliably decode the clients' message in all the examples described, the client node can perform retransmission, which can be used together with the first message transmission in the form of hybrid-ARQ to reliably decode the original message with increased diversity gains obtained by multi BS cooperation, and retransmissions of hybrid-ARQ (HARQ). The HARQ method can either be of chase combining, which means an identical message is retransmitted, or in the form of incremental redundancy HARQ, which generally allows achieving higher throughput.

The exemplary cluster 1200 in FIG. 12 may provide increased uplink coverage in comparison to a cluster which does not support uplink macro-diversity in the form described herein or in any of its variations. That is since the diversity gains obtained allow achieving a specific quality of service (QoS) in BS greater distance.

The exemplary cluster 1200 in FIG. 12 can provide increased uplink throughput in comparison to a cluster, which does not support uplink macro-diversity in the form described herein or in any of its variations. That is because the diversity gains obtained from the joint operation of the base stations within the cluster allow achievement of higher throughput for a given cellular network deployment.

The exemplary cluster 1200 in FIG. 12 enables reducing the number of handovers in comparison to a conventional cluster, since within the described cluster all slave-BSs communicate with the master-BS. All messages are received at the master-BS, which is in turn connected to the backhaul. Therefore, even if an exemplary client node is decoded by a slave-BS, the message is forwarded to the master-BS. Thus there is no handover process within a cluster for uplink purposes.

The exemplary cluster 100 in FIG. 12 enables efficient MIMO uplink communications through joint decoding using several BS nodes. High efficiency of MIMO on the uplink may be achieved since the distance between antennas, in the suggested distributed MIMO architecture, is as large as the distance between BSs, which introduces low correlation between antennas with high probability. Hence the example in FIG. 12 is advantageous also in increased degrees of freedom, which enables multi-stream uplink (MIMO communications), which immediately translates to throughput gains.

Uplink cooperation as exemplified in FIG. 12 enables a more homogenous coverage within a cluster then conventional non clustered deployment, since the signal propagation path between client and BS may vary dramatically within a sector of a BS. In some cases a client located in a sector of one BS, will be received at higher quality by another BS. Without the uplink cooperation as described in the example of FIG. 12 and its variations, a lower quality of service may be provided and frequent handovers may occur.

In addition to the benefits of uplink cooperation within the cluster described hereinabove, when the underlying modulation is OFDM, or any other orthogonal multiplexing, the channel quality may change on a per frequency band basis. This means that by using the uplink cooperation, better performance may be achieved in a per sub-band basis. The uplink cooperation is significantly better than using, for example, selective diversity, which chooses only one BS for the whole symbol, and thus loosing the diversity gains promised. The uplink cooperation is unlike narrow band communication, where usually selective diversity suffices.

In summary, the present embodiment is one in which one out of every several base-station (BS) nodes creates a cluster. Within a cluster, there is only one central base-station, namely the master-BS. All other BSs are controlled by the master-BS, and are therefore denoted slave-BSs. Within every cluster BS nodes cooperation is carried out in the physical layer, which thus increases the cluster coverage and capacity over the case of each base station working independently.

Control may be through a wireless connection, or a wired connection, including backhaul connections.

Slave-BS are access nodes like the master BS, although the slave-BSs may perform only physical layer processing.

Slave-BSs may perform physical layer processing for receiving their uplink data, and any required preprocessing for forwarding the received data to the master-BS.

In some cases, slave-BSs may perform physical layer processing, and the slave BSs may fully decode their received data prior to forwarding. However in the case that the slave BS cannot reliably decode its input, the slave BS prepares a local observation, and forwards the local observation to the master BS on a communication link.

The local observation may be a quantized version of the actual received signal on the slave BS's antennas.

The communication link may be the master-slave communication link, which can be either wireless, or a wired communication link, and may use other network nodes, such as relays, repeaters etc. Additionally, the wireless communication link may be either a wireless link which reuses the access bandwidth, or may use an orthogonal frequency band for transmission of the observations.

Reuse of access bandwidth may comprise the actual bandwidth used by client nodes for communicating with base-stations. The reuse may be pursued by using for example time-division duplex (TDD), frequency-division duplex (FDD) or code-division duplex mechanisms.

The base station may be any type of access node, which serves client nodes.

The BS nodes may cooperate for both uplink and downlink processing, which allows distributed multiple input multiple output (MIMO) or smart antenna processing, centrally controlled at the master-BS.

Distributed MIMO comprises any form of uplink and downlink multi-antenna processing on more than one BS node.

The cluster comprises at least two cooperating BSs or three cooperating BSs or numbers larger than three.

An increase in cluster coverage may result due to any type of distributed MIMO processing, and increases in link-budget may be translated to coverage enhancement.

Clusters may provide efficient mobility support. Within a cluster there need not be any handover of a client node between BSs. Clusters may be viewed by a client node or by any external node as a single logical BS. A single logical BS means that a client node becomes associated with the cluster as a whole, rather than a particular BS within the cluster. In such a case, handover protocols operate between clusters. A client node may pursue handovers from a cluster to any other BS which complies with the particular cellular network standard.

The controller and the term "controlled" include the property of the slave-BS to use processing which depends on control signals received from the master-BS.

Any number of base stations BS may perform master-BS or slave-BS functionalities within a cluster, or any combination of the master-slave functionalities.

In an embodiment, a slave BS may be used by two clusters, that is by two master BSs. BSs may be switched between master and slave modes.

A cluster may be dynamically defined, for example based on current load. The functions within the cluster of any given base station, as well as cluster association may be changed in accordance with such dynamic redefinition. The definition of the clusters, whether dynamic or otherwise, may be carried out in distributive or centralized manner.

Figure 13:
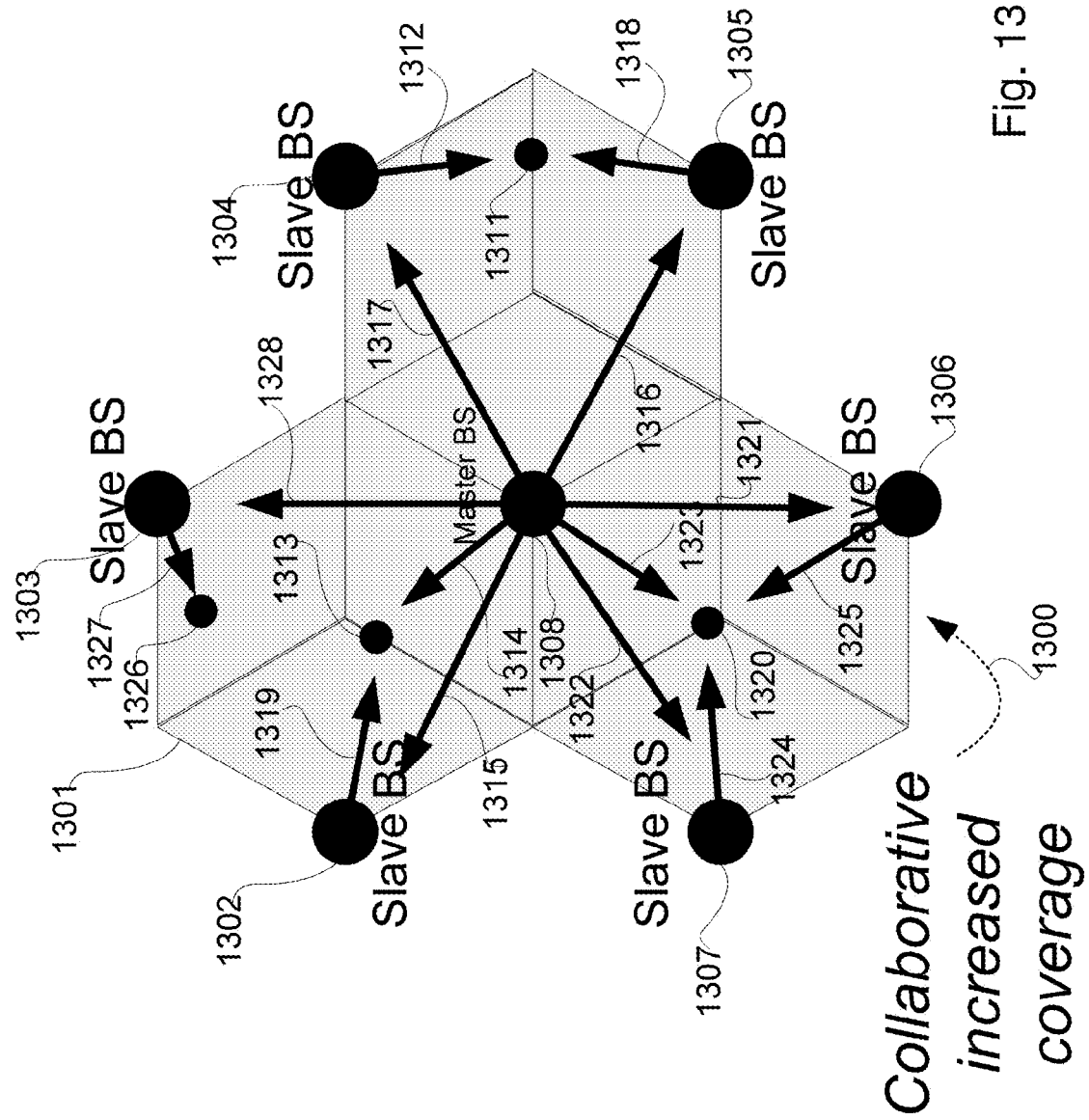
FIG. 13 is a network diagram illustrating the application of clustering according to an embodiment of the present invention to a network of base stations and showing downlink to client nodes.

Reference is now made to FIG. 13, which illustrates an exemplary cellular network 1300 that includes seven BSs which create a cluster, 1302, 1303, 1304, 1305, 1306, 1307, 1308. The central BS is 1308, also denoted as master-BS, and need be the only BS of the cluster which is connected to a backhaul infrastructure. The example includes a sectorized BS configuration, where each sector, e.g. 1301 has roughly 120 degrees coverage. There are a few exemplary client nodes within the illustrated cluster, 1311, 1313, 1320, 1326. An exemplary downlink transmission to these clients is described next. The downlink transmission to all clients starts at the master-BS, which need be the only node within the cluster that is connected to the network infrastructure, backhaul, as mentioned above. The master BS can send independently to any client which can receive its transmission in sufficiently high quality. It can also forward a message to a slave-BS and let the slave transmit independently.

Another example for downlink transmission depicted in FIG. 13 is downlink to client node 1313, which begins with an initial message 1315 to slave-BS 1302. After the message has been forwarded, both slave-BS 1302 and master BS 1308 can begin a cooperative downlink transmission, where slave-BS 1302 transmits message 1319, and master-BS 1308 transmits message 1314. Both the slave-BS and the 1302 and the master-BS 1308 can transmit for example the same identical message, say on links 1314 and 1319. Such cooperation increases the overall received power at the client node 1313, and also benefits from an increased diversity gain. The cooperative downlink of 1302 and 1308 can also use for example Alamouti STC to maximize the diversity gain which adds to power gain described earlier, and together increase communications efficiency. For this type of cooperation the client node may support the Alamouti STC. Any type of STC and MIMO transmission is supported for the cooperative downlink, and only requires that master BS 1308 sends a suitable initial message to slave-BS 1302 so that cooperative downlink may take place. An immediate benefit of the example here is that high multiplexing gains are guaranteed since the transmitting antennas are sufficiently far away, located in different BSs (1302 and 1308 in this example), thus also reducing keyhole effects.

Another example for downlink transmission depicted in FIG. 13 is a downlink to client node 1311, which begins with an initial message 1316 to slave-BS 1305, and an initial message 1317 to slave-BS 1304. After the messages are forwarded, both slave-BS 1304 and slave BS 1305 can begin a cooperative downlink transmission, where slave-BS 1304 transmits message 1312, and slave-BS 1305 transmits message 1318. When both slaves transmit an identical message, then the initial messages 1316 and 1317 can also be an identical single message, which is decoded to both slaves. In case the link between master-BS and slave-BSs is a wireless link, messages 1316 and 1317, being identical messages, can be transmitted as a single transmission, making reuse of spectral resources. That reuse reduces by half the resources required for transmitting the initial message of this example. In that case, slave BSs 1304, and 1305 of the example increase the overall received power at the client node 1311, and also benefit from an increased diversity gain. Optionally, the initial messages 1316, 1317 can be different, and thus enable distributed MIMO of the different forms. In this respect, the cooperative transmission is similar, and the only difference in concept is that two slave-BSs cooperate rather than a master-BS and slave-BS. In addition, smart antenna techniques can be used here, such that the signal to noise ratio, rather than multiplexing gain is maximized at the client.

Another example for downlink transmission depicted in FIG. 13 is downlink to client node 1320, which begins with an initial message 1321 to slave-BS 1306, and an initial message 1322 to slave-BS 1307. After the messages are forwarded, slave-BS 1306 and slave BS 1307 and master BS 1308 can begin a cooperative downlink transmission, where slave-BS 1306 transmits message 1325, and slave-BS 1307 transmits message 1324, and master-BS 1308 transmits message 1323. The possible different message types are similar to those exemplified hereinabove. When messages 1324 and 1325 are identical, the same relaying options mentioned above exist. In this example client node 1320 can receive BS nodes 1306, 1307, and 1308 all in sufficiently high quality. This guarantees higher degrees of freedom than the examples described hereinabove, and thus may allow robust MIMO communications which can translate to high throughput and spectral efficiency.

Another example for downlink transmission depicted in FIG. 13 is downlink to client node 1326, which begins with an initial message 1328 to slave-BS 1303. After the message is forwarded, slave-BS 1303 transmits the downlink message 1327 to client node 1326. In this example there is no cooperative transmission, since client node 1326 receives a high quality signal from slave BS. In such cases it might be superfluous to do cooperative transmission, since it might turn out that sufficiently high quality signals cannot be received by the client from any BS but one. As an example, such scenarios may occur when a client node is in close proximity to a certain BS.

The exemplary cluster 1300 in FIG. 13 may provide increased downlink coverage in comparison to a cluster, which does not support downlink macro-diversity in the form described herein or in any of its variations. Such may apply because the transmission power gains and diversity gains obtained allow achieving a given quality of service (QoS) with greater distance between BSs.

The exemplary cluster 1300 in FIG. 13 may thus provide increased downlink throughput in comparison to a cluster which does not support downlink macro-diversity in the form described herein or in any of its variations. Such may occur because the transmission power gains and diversity gains obtained allow achieving higher throughput for a given cellular network deployment.

The exemplary cluster 1300 in FIG. 13 enables reducing the number of handovers in comparison to a conventional cluster, since within the described cluster all slave-BSs communicate with the master-BS. All messages originate at master-BS, which is connected to backhaul. Therefore an exemplary client node may receives the transmission from a given slave-BS, even though the message was originally scheduled and transmitted from the master-BS as exemplified hereinabove. Thus there is no handover process within a cluster for downlink purposes.

The exemplary cluster 1300 in FIG. 13 enables efficient MIMO downlink communications through cooperative (joint) transmission using several BS nodes. High efficiency of MIMO on the downlink may be achieved since the distance between antennas, in the suggested distributed MIMO architecture, is as large as the distance between BSs, which introduces low correlation between channel quality received by different antennas with high probability. Furthermore, downlink transmission from multiple BSs allows increasing the overall transmission power by the number of cooperating BS. Hence the example in FIG. 13 is advantageous in increased degrees of freedom and higher overall power, which enable multi-stream downlink (MIMO communications), which translates to throughput gains.

The cooperative downlink example in FIG. 13 benefits a power increase ratio equal to the number of BS nodes transmitting to the same client node, when for example there is a maximal average power limitation per BS, as set by locally enforced power emission regulations. For example, two BSs transmitting synchronously to the same client node can then transmit using double the overall power that the single base station is allowed.

Figure 15:
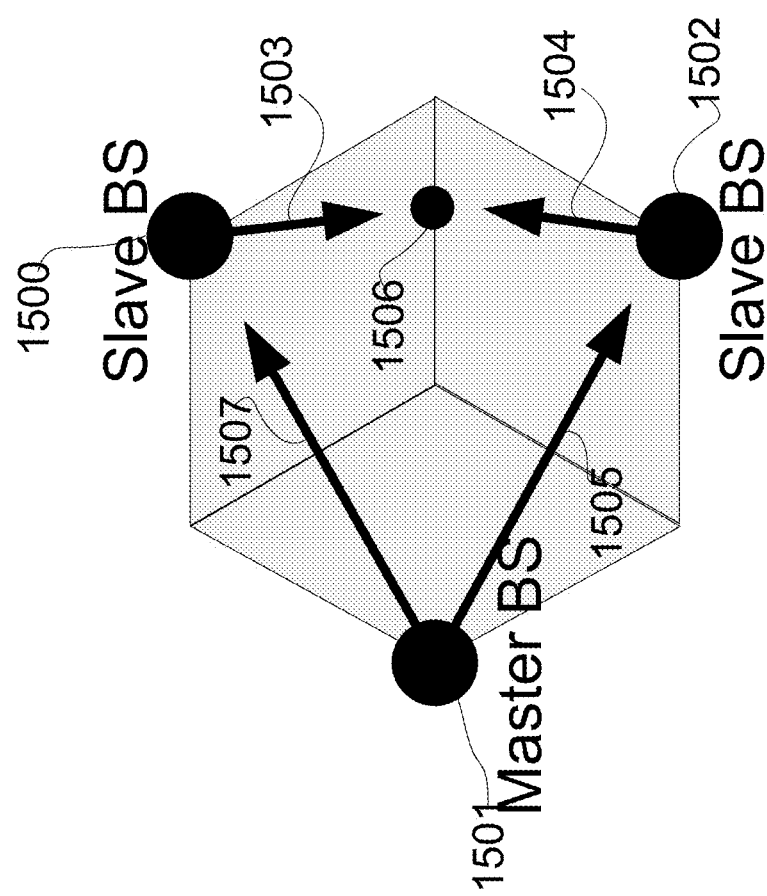
FIG. 15 is a network diagram showing a cluster of three nodes carrying out cooperative downlink according to an embodiment of the present invention.
Figure 23:
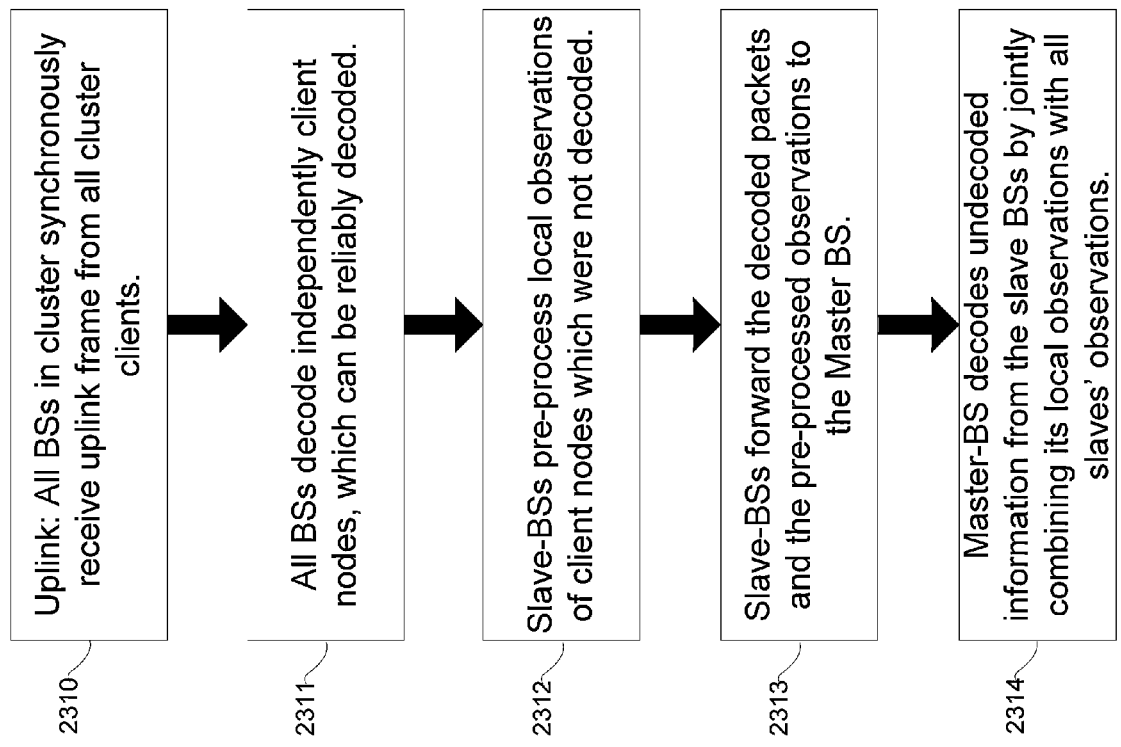
FIG. 23 is a simplified flow chart illustrating uplink reception by a cluster according to an embodiment of the present invention.

The cooperative downlink transmission, which is exemplified in FIG. 13, FIG. 15, and FIG. 23 can takes place over the same frequency band. For implementation with multiple BSs, all BSs within a cluster may perform frequency offset correction, in order to compensate for any possible frequency difference between local oscillators of the BSs within a cluster.

The cooperative downlink transmission, which is exemplified in FIG. 13, FIG. 15, and FIG. 23 is originated by the said master-BS. Hence the master-BS is aware of all client nodes within its cluster. The master-BS may plan and control the downlink cooperative transmission. Hence, the master-BS can take the required measures to minimize the inter-cell interference within its cluster. For example, in an OFDMA system, the master BS can allocate similar frequency sub-bands only to highly separated users. The master BS may further determine which users are highly differentiated by the difference in their reception quality of the different BSs within the cluster. Thus planning in advance of the transmission scheme within a cluster may provide high inter-cell interference resilience within a cluster.

In the examples of both FIG. 12 and FIG. 13 there may be cooperative downlink transmission and cooperative uplink, in the form explained above between different sectors of the same BS. For example, a client node which is received in sufficiently high quality at the master BS on two of its sectors can be jointly decoded using the combined observations of the client's signal from both sectors' antennas. Furthermore, downlink cooperation in the forms mentioned above for increased diversity or MIMO throughput can be obtained by cooperatively transmitting from two sectors to a single client. The main difference here with the master-BS slave-BS cooperation is that no initial message has to be sent on downlink, and no preprocessing transmission message is needed for uplink, due to the locality of sectors within a single BS.

The cooperative uplink and downlink transmissions, which are exemplified in FIG. 12 and FIG. 13 originate and are controlled by the master-BS. The master-BS is aware of all client nodes within its cluster. The master-BS plans and performs the downlink cooperative transmission. Hence, it can allocate resources efficiently within its cluster. For example, in an OFDMA system, the master BS can allocate a small fraction of sub-bands to slave-BSs with few clients, and low throughput requirements, and may allocate a large fraction of sub-bands to a slave-BS cell with many clients demanding a high total throughput. Thus the overall throughput and QoS may be substantially improved due to highly flexible load balancing of the cluster architecture disclosed herein. The master BS may also instruct the client device to use certain sub-bands in order to get higher power at the receiving antennas, as done in a non-clustered architecture.

The downlink cooperative transmission illustrated in FIG. 13 may include for example efficient beamforming using separate and distributed beamforming, in a TDD system, for extending coverage and increasing the capacity of downlink transmission. Separate beamforming refers to the case where two or more cooperating BSs gain channel side information from the uplink, and each BS computes its own beamforming weights for smart antenna downlink transmission. In separate downlink beamforming, the BSs are not jointly calibrated, and may transmit with different phases. While not optimal this approach may be more efficient than naïve omni-directional transmission. With distributed beamforming, a special mechanism of phase calibration is required, and enables multi-BS coordinated transmission, for maximal downlink efficiency.

In case the BSs are fully synchronized OFMDA TDD systems with separate beamforming capabilities, a simple mechanism of identical cyclic shift delay on all antennas of the slave BS may be applied prior to a beamforming weight computation to prevent unintentional destructive separate beamforming of master and slave BSs. Such a scheme may allow benefit from the array gain of each BS in addition to diversity and power gains of the downlink, without having to perform distributed phase calibration.

Figure 14:
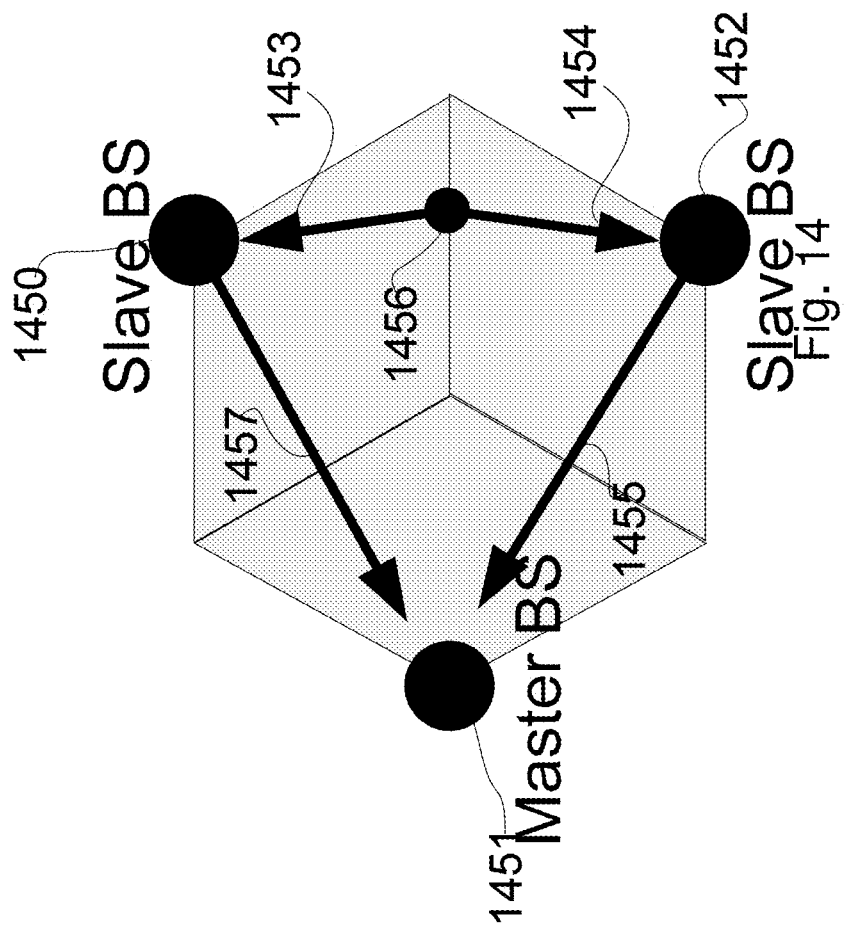
FIG. 14 is a network diagram showing a cluster of three nodes carrying out cooperative uplink according to an embodiment of the present invention.

Reference is now made to FIG. 14, which illustrates an exemplary cluster consisting of only three sectors, with uplink cooperation. In this cluster, uplink cooperation can be employed with at least two BSs reaching every point of the sector far border. For example, client node 1456 is received (1453, 1454) in sufficiently high quality at slave BSs 1450 and 1452. These slave-BSs perform preprocessing in the form exemplified and explained in FIG. 12, and forward messages 1457 and 1455, to master BS 1451. Then master BS 1451 combines its two inputs and decodes the message.

Another aspect of FIG. 14 is that increase in coverage, which results from cooperation in the uplink between at least two BSs can be achieved with 3 sectors each having separate BSs. The advantage of such a scheme is that cooperation is required between a master-BS sector and two other slave-BS sectors, and it is not necessary for all the slave base stations to be involved with every mobile station.

FIG. 15 illustrates an exemplary cluster consisting of only three sectors, with downlink cooperation. In this cluster, highly efficient downlink cooperation can be used with at least two BSs on every point of the far border of the sector. For example client node 1506 receives two messages (1503, 1504) in sufficiently high quality from slave BSs 1500 and 1502. These messages can be identical or different to achieve high diversity gains or distributed MIMO gains. The slave BSs receive their information from master BS 1501, which transmits messages 1505 and 1507, which, as above, can be identical and thus reuse resources in transmission, or two different messages which maximize diversity or distributed MIMO throughput.

Another aspect of FIG. 15 is that increase in coverage, which results from cooperation in downlink of at least two BSs can be achieved with 3 sectors of separate BSs. The advantage of such scheme is that cooperation is only needed between a master-BS sector and just two other slave-BS sectors to achieve the benefits of clustering.

A drawback of a cluster which is exemplified in FIGS. 14 and 15, compared to the cluster exemplified in FIGS. 12 and 13, is that in the clusters of FIGS. 14 and 15 there is a rather small reduction in number of handovers between BSs, and there is less flexibility in reducing inter-cell interference within the cluster. Furthermore, dynamic resource allocation is also limited in comparison to FIG. 12, as the resources shared are only those allocated to the 3 sectors within the cell, hence less flexibility is available in comparison to the clusters of FIG. 12 and FIG. 13.

Figure 16:
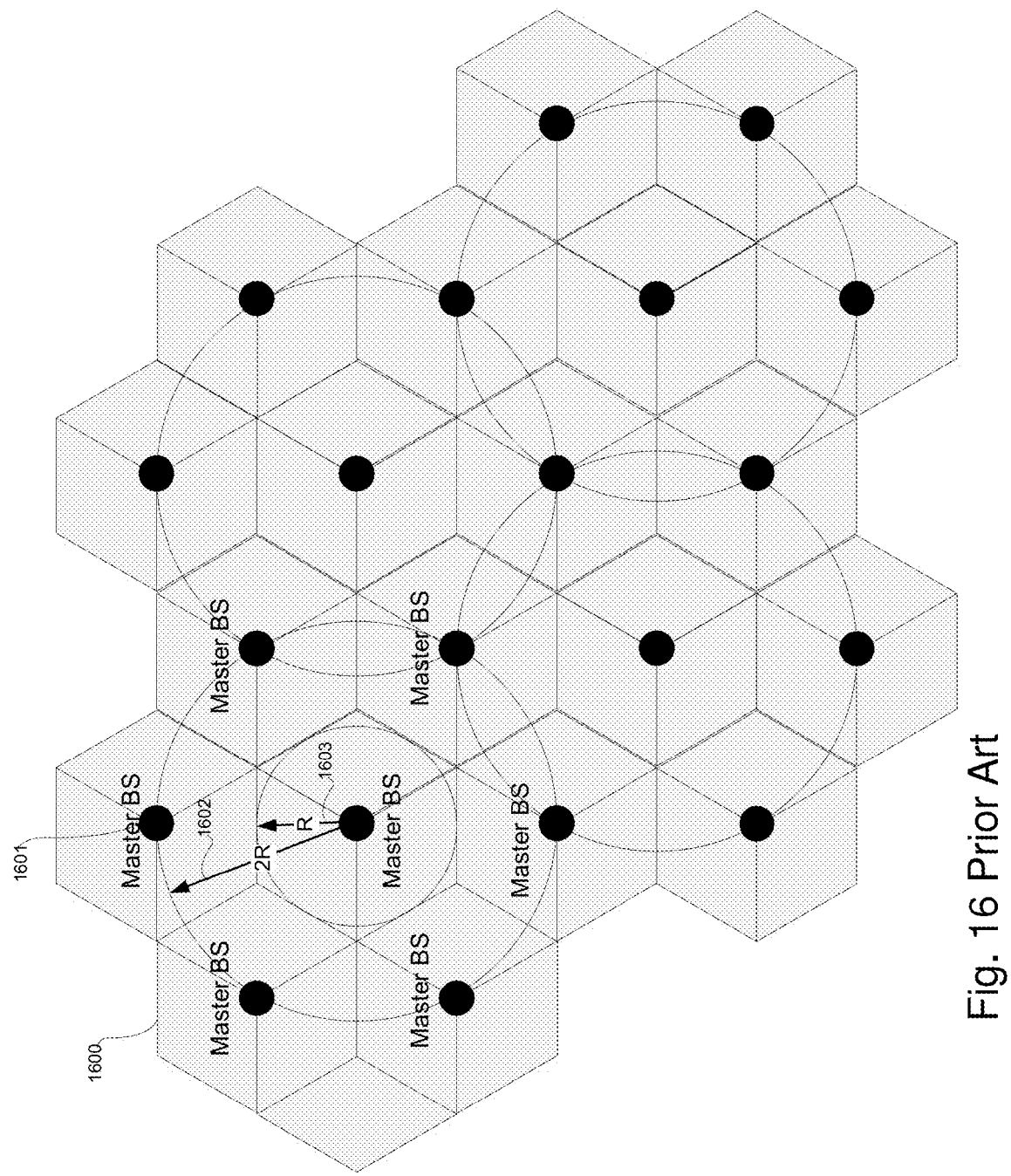
FIG. 16 is a network diagram showing base station sectors according to the prior art.

Reference is now made to FIG. 16 which illustrates a prior art BS deployment with three sectors for each BS. In this prior art operation, there is no cooperation on uplink and downlink via slave BSs. FIG. 16 emphasizes that coverage radius of every sector is the same, denoted R, 1603. An example for the use of the FIG. 16 case is soft handover, where more than one BS can receive and decode a client node signal.

However, soft handover protocols usually have to be supported by client nodes, and cannot be used for long time periods with high payload traffic demands. Hence even if soft handover is supported it does not translate into increased coverage or higher throughput.

Figure 17:
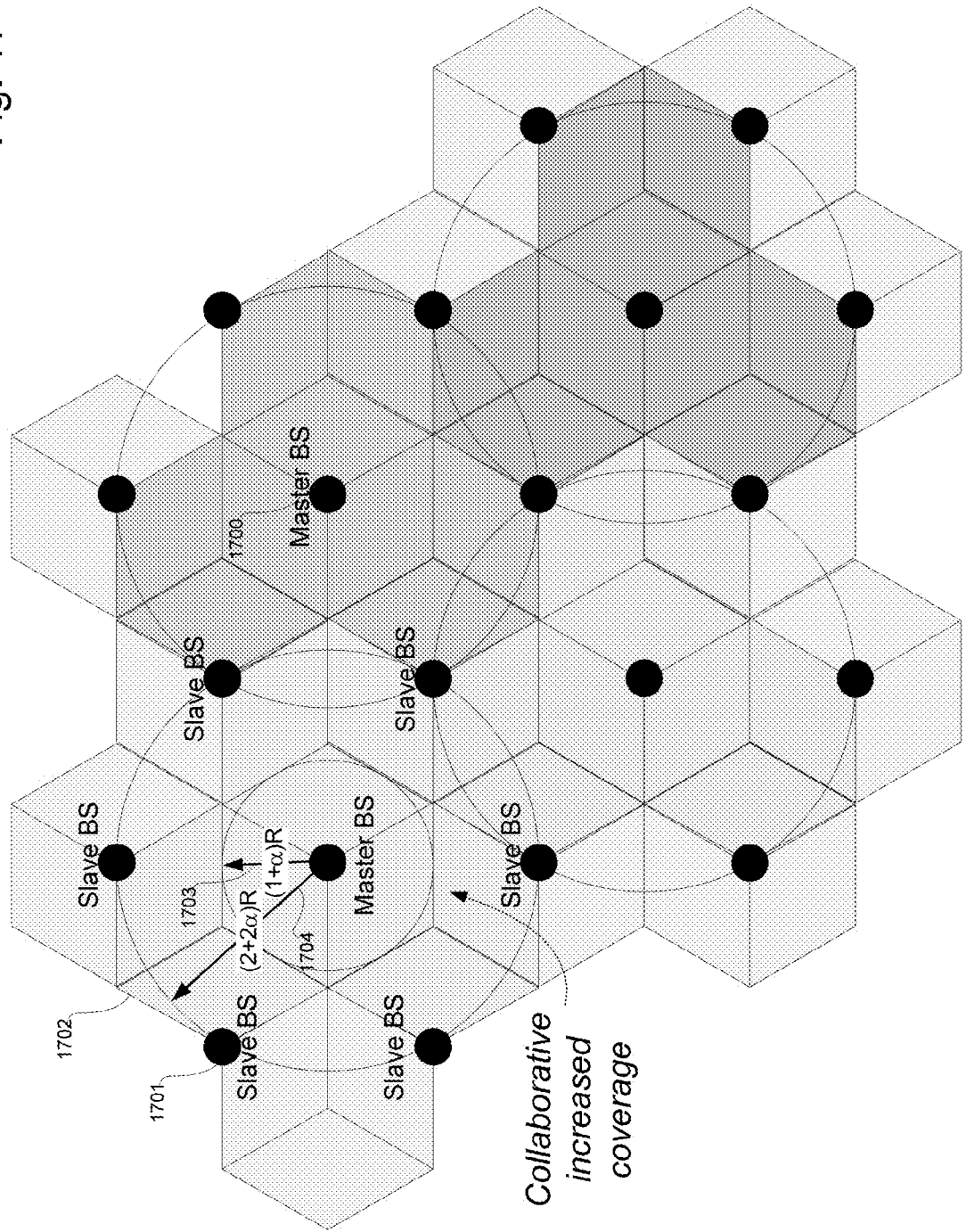
FIG. 17 is a network diagram showing clustering of base stations according to an embodiment of the present invention.

Reference is now made to FIG. 17, which illustrates an exemplified BS deployment according to the present embodiments, with multiple clusters of the type exemplified in FIG. 12 and FIG. 13. FIG. 17 emphasizes the potential translation of increased operational coverage to lower density deployment without decreasing QoS with respect to the prior art deployment in FIG. 16. With multiple clusters in FIG. 17, where every cluster is identical to the cluster described in FIG. 12 and/or FIG. 13 a total coverage increase may be achieved, enabling increased area coverage for the deployment in FIG. 17 compared to that of FIG. 16. As an example, for a decay propagation exponent of 3.5, in the 2.5 GHz-3.5 GHz band, it follows from the COST231-Hata model that the radius of every sector in FIG. 17 is increased by 30% into 1.3R see 1703. Hence a BS dilution of 40% is expected in comparison to a prior art type of deployment, and for equivalent QoS requirements.

Figure 18:
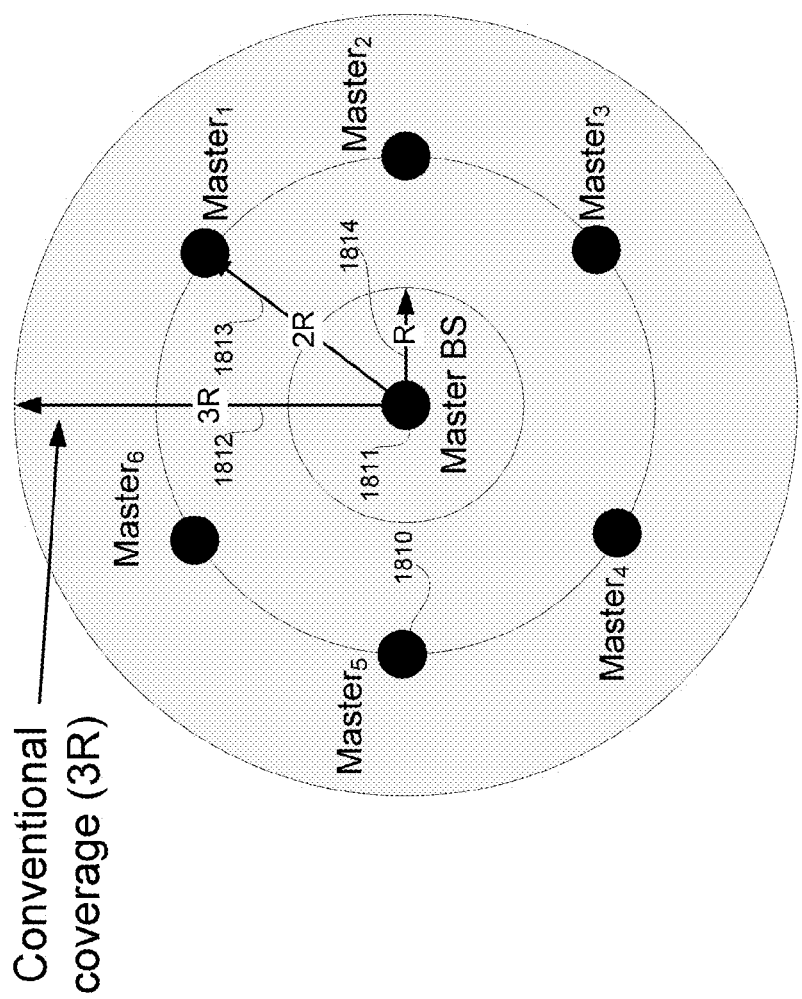
FIG. 18 is a simplified schematic diagram illustrating coverage of a network under a conventional configuration of base stations.
Figure 19:
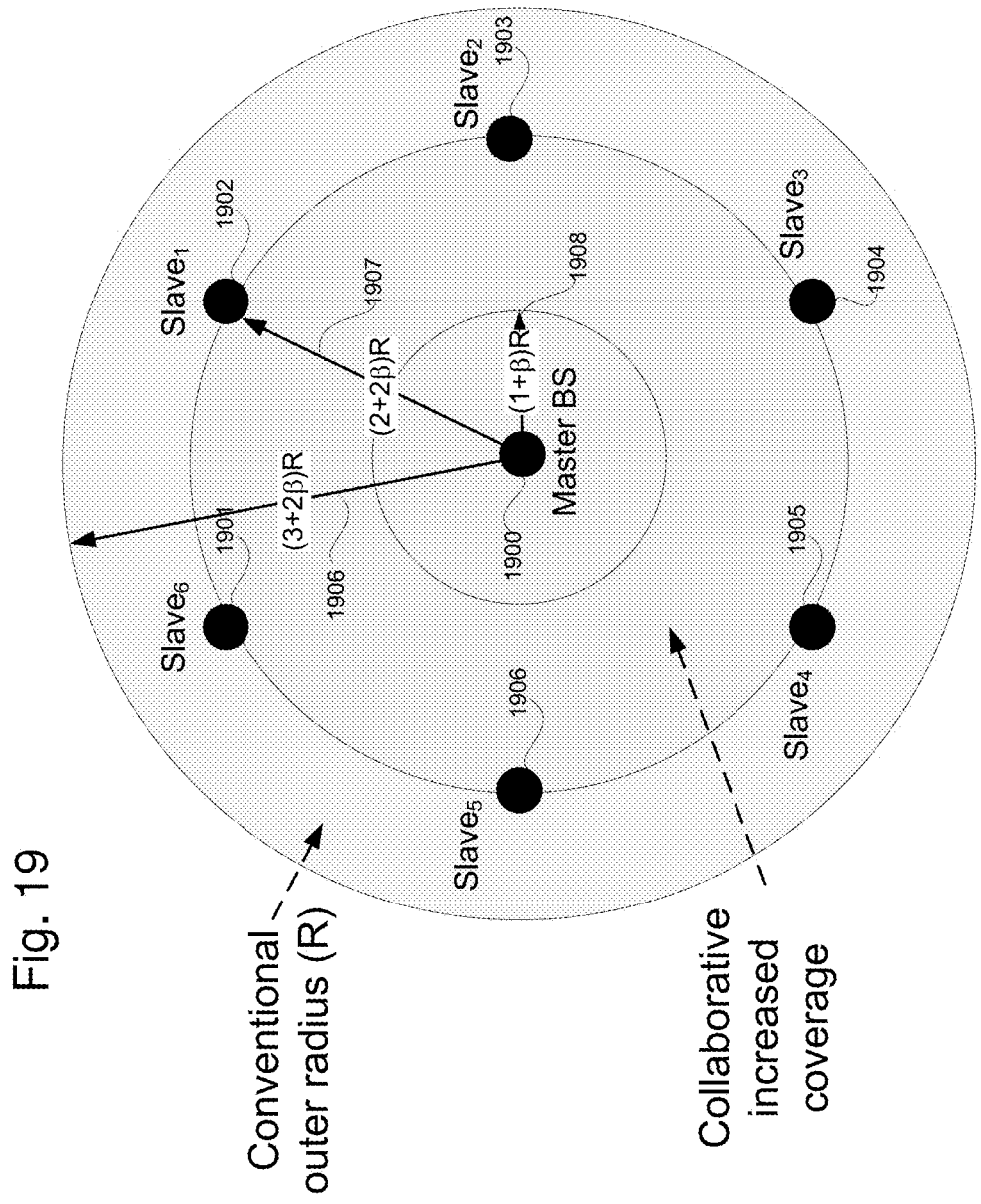
FIG. 19 is a simplified schematic diagram showing how the coverage of FIG. 18 can be improved by using collaboration between base stations according to embodiments of the present invention.

Reference is now made to FIG. 18 which is a prior art configuration showing a non-collaborative network and FIG. 19 which shows a collaborative network in accordance with the present embodiments. FIG. 18 and FIG. 19 both show a cluster structure with 7 BSs, where each BS has an omni-directional antenna. The inner radius of FIG. 19, denoted by 1908 is increased when compared to the prior art BS coverage radius 1814. Also, the second circle radius 1907 is increased, again when compared to 1813 due to cooperation between at least two BSs at every point within the second circle. Finally, the outer circle 1806 is increased only by R when compared to 1807, which results from the exemplary architecture constraints that there is no cooperation between clusters. Using the same assumptions as above, namely a decay propagation exponent of 3.5, in the 2.5 GHz-3.5 GHz band, it follows from the COST231-Hata model that the radius of the inner circles in FIG. 19 is increased by 30% into 1.3R see 1908. Hence a BS dilution of approximately 30% is expected in comparison to a prior art type of deployment of omni-directional BS cells, and for similar QoS requirements.

Figure 20:
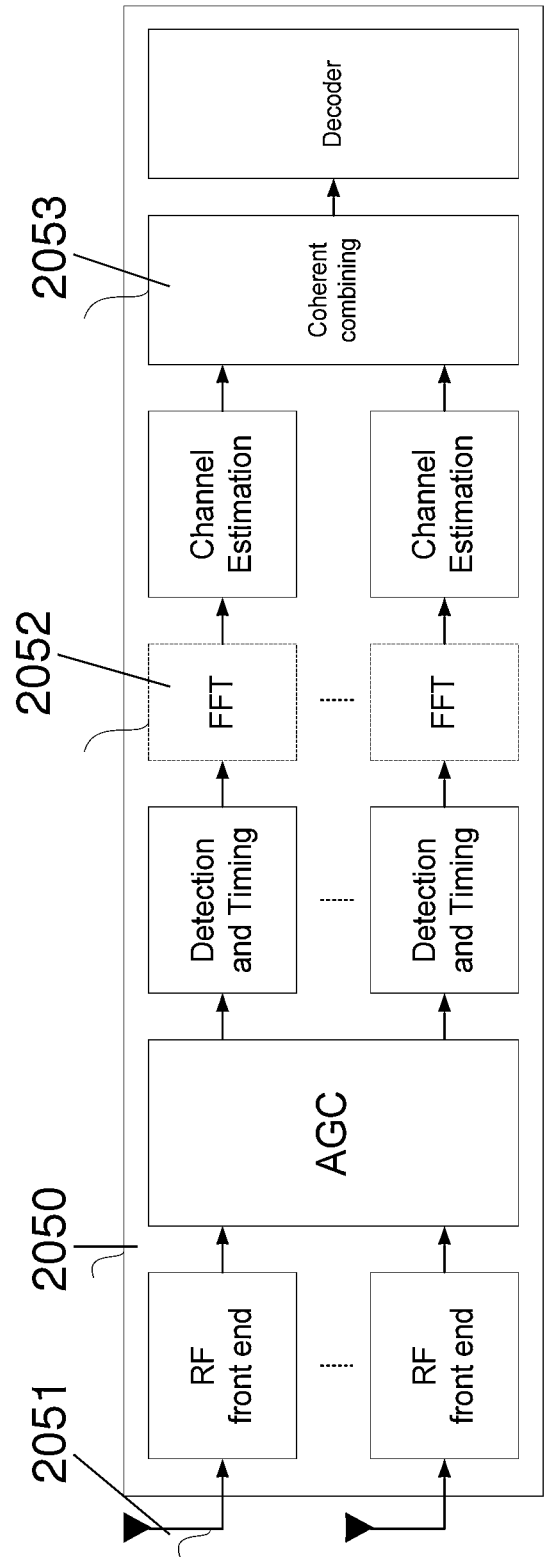
FIG. 20 is a schematic block diagram illustrating a conventional multi-antenna base station receiver.

Reference is now made to FIG. 20, which illustrates an example of related art example of a multi-antenna BS receiver 2050. An uplink signal is received on antenna 2051 and other antennas of the BS. It passes first a processing chain for each BS antenna. The processing chain includes an analog and digital radio frequency (RF) front end (FE), its output is connected to an automatic gain control (AGC) module, which is responsible for scaling the digital input. Sometimes the AGC is a common module for all RF chains of same BSs. Following the AGC is a synchronization module, which detects an input signal with its accurate timing information. Then typically, in OFDM systems an FFT 2052 is performed. This is typical also for other wideband signal processing, but is not always necessary, and therefore appears in dotted line. The block that follows performs channel estimation for each RF chain separately. After which a coherent combining module 2053 operates on all RF chains and produces a single soft output for the decoder, which decodes the original signal.

Figure 21:
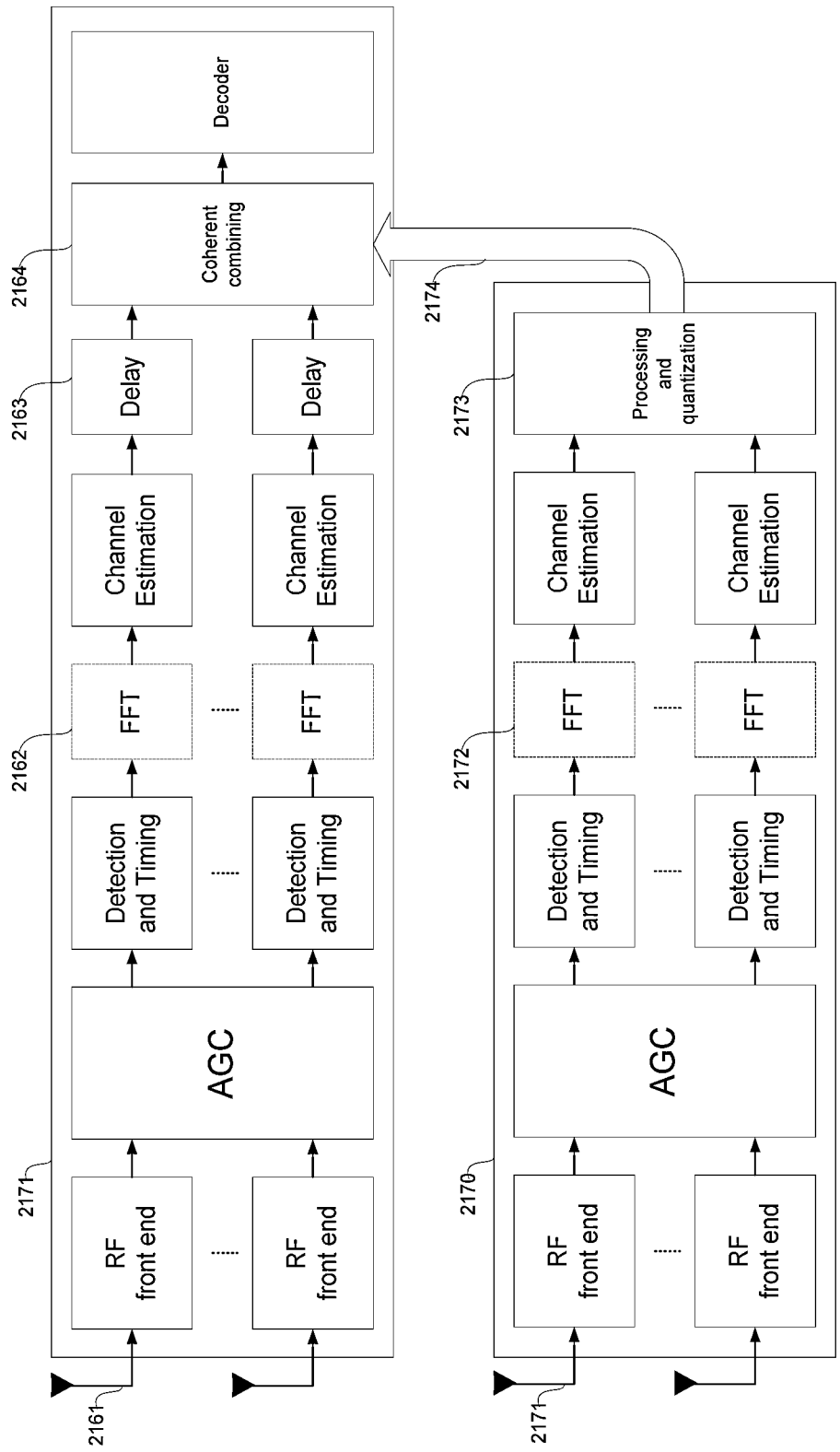
FIG. 21 is a schematic block diagram illustrating a modification of the multi-antenna base station receiver of FIG. 20 to provide for collaborative decoding according to embodiments of the present invention.

Reference is now made to FIG. 21, which illustrates an exemplary cooperative uplink of two multi-antenna BS receivers 2160, and 2170, according to an embodiment of the present invention. The master-BS in this example is 2160, and the slave-BS is 2170. An uplink signal is received on master-BS antenna 2161 and other antennas of the master-BS. The signal is simultaneously received on slave-BS antenna 2171 and other antennas of the slave-BS. The signal passes first a processing chain for each BS antenna. The processing chain is identical to that described hereinabove up to the channel estimation module output. The slave-BS processes the signal with its channel estimation, and for example may coherently combine its local observations, and optionally in addition, perform suitable quantization or compression and prepare a message to be sent to the master-BS. The master-BS waits with its local processing, illustrated by delay block 2163, till the slave-BS sends its complete or partial message. The master BS decodes the slave-BS's message first, then aligns 2163 it with its local observation of the same signal and jointly processes its local observation with the received signal from the slave-BS, which is done by means of, for example, coherent combining. The output of the module can be passed to the decoder for the completion of decoding of the original message.

Figure 22:
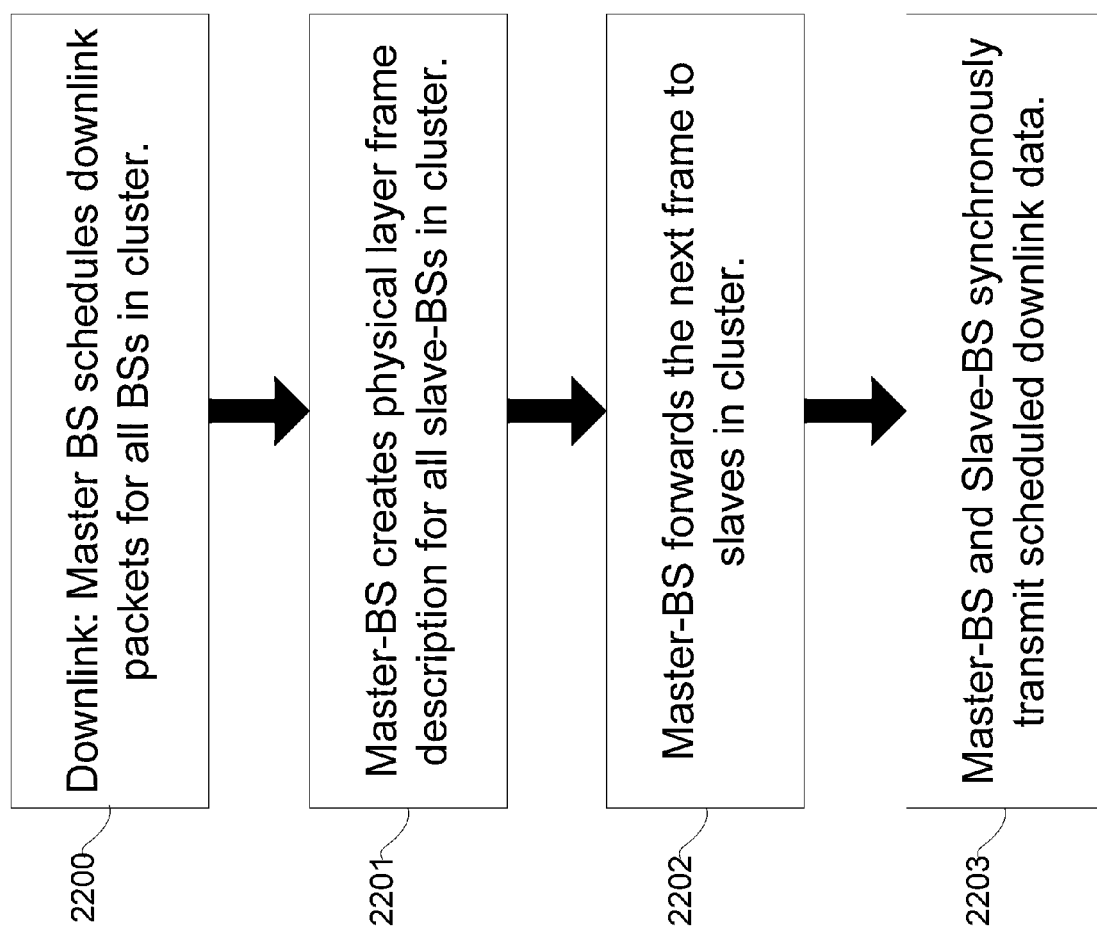
FIG. 22 is a simplified flow chart showing the stages of downlink scheduling for a base station cluster according to an embodiment of the present invention.

Reference is now made to FIG. 22, which illustrates an exemplary flow of actions in accordance with the present embodiments, which includes the main steps of downlink transmission. The first step 2200 involves the master-BS scheduling a downlink message for all BS nodes within its cluster. In a TDD system for example, where downlink and uplink are synchronized between BSs, the master BS can schedule the downlink messages on a frame basis. The downlink frame is defined as the duration the BSs are in downlink state until switching to the uplink state. The master-BS can schedule downlink messages locally and for the slave-BSs dynamically, on a per-frame basis, thus achieving dynamic resource allocation and load balancing within the cluster.

As a second step 2201, the master-BS creates a downlink physical layer (PHY) frame description locally and for all slave-BSs in the cluster. The frame description includes all specifications necessary for the slave-BSs to perform their downlink, e.g. controls of spectral resources transmission power, code rate, modulation, etc. That is required in addition to the PHY frame scheduled to be forwarded to the slave-BSs. In step 2202 the master-BS forwards a PHY frame to all slave-BSs within the cluster. The slave-BSs decode the frame with all its controls and prepare their local downlink frame, based on the decoded message. The frame forwarding from the master-BS to the slave-BSs can be performed for example on a wired infrastructure such as copper or fiber, or on wireless links. The wireless links can partially use the BS access spectrum, or use dedicated relaying spectrum, which is orthogonal to the access bandwidth. The dedicated access band can be either licensed or unlicensed. The last step 2203 is the actual downlink transmission from all BSs in the cluster. In order to efficiently utilize cooperative transmission on downlink, the slave-BSs are synchronized with the master-BS in time for starting transmission simultaneously. In addition, the slave-BSs apply frequency offset compensation so that the center frequency of slave-BSs transmission will be in negligible offset relative to master-BS.

The steps described hereinabove are performed on a downlink frame basis, and therefore a continuous downlink can be performed from all BSs in the cluster for every downlink frame. If the relaying does not use the spectral resources of the BSs, then at least an as high throughput can be obtained as if there were no relaying. This means that cooperative downlink in a distributed manner as described may achieve high throughput, at the expense of higher latency by only a single frame. Relaying as per the embodiment of FIG. 22 introduces a single frame delay in the downlink.

Reference is now made to FIG. 23, which is a simplified flow chart showing the main steps in uplinking within a cluster according to a preferred embodiment of the present invention. The first step 2310 includes receiving an uplink frame at all BSs. This requires all BSs in the cluster to be simultaneously in receive mode. It is assumed that multiple users are performing uplink. In the following steps 2311, 2312 all BSs decode the client nodes' messages which can be reliably decoded, and slave-BSs preprocess messages which cannot be reliably decoded separately.

The next step 2313 is performed with a delay that is smaller than or approximately the same as a frame, of uplinking the slave-BSs forward preprocessed observations to the master-BS. The slave-BSs also add all necessary control information, such as for example received SNR, channel estimation, frequency offsets of the client node, and any other required control for allowing the BS to complete decoding, and select scheduling and resource allocation strategies for client nodes.

The last step 2314 includes decoding the messages from all slave-BSs and jointly combining preprocessed samples of clients which were not decoded independently. That can be for example combining local master-BS preprocessing with the preprocessing of a slave-BS for a specific client node. It can also be for example combining of observations from two slave-BSs. It can also be for example combining of observations from two slave-BS with the local observation of a master-BS, etc.

The decision in 2311, 2312 whether to decode the received message or to preprocess and forward a processed observation can be taken dynamically for example based on parameters such as received signal to noise ratio (SNR), or the decoding CRC, or any other quality measure. This decision can also be taken in advance for example by the master-BS. This may be done in networks where the BS allocates the resources for client nodes on both uplink and downlink.

In addition, the forwarding in step 2313, may start at the end of the uplink reception or it can start for example with a shorter delay, when there is no need to jointly process all the uplink frame. For example, when the uplink message is coded with a convolutional code, and decoded with a Viterbi decoder, the transmission of the relayed message can start after the first symbol for forwarding is ready. That is due to the nature of the Viterbi decoder, which has a fixed delay, and does not process the whole uplink block jointly, in contrast for example to a BCJR (Bahl) decoder.

Figure 24:
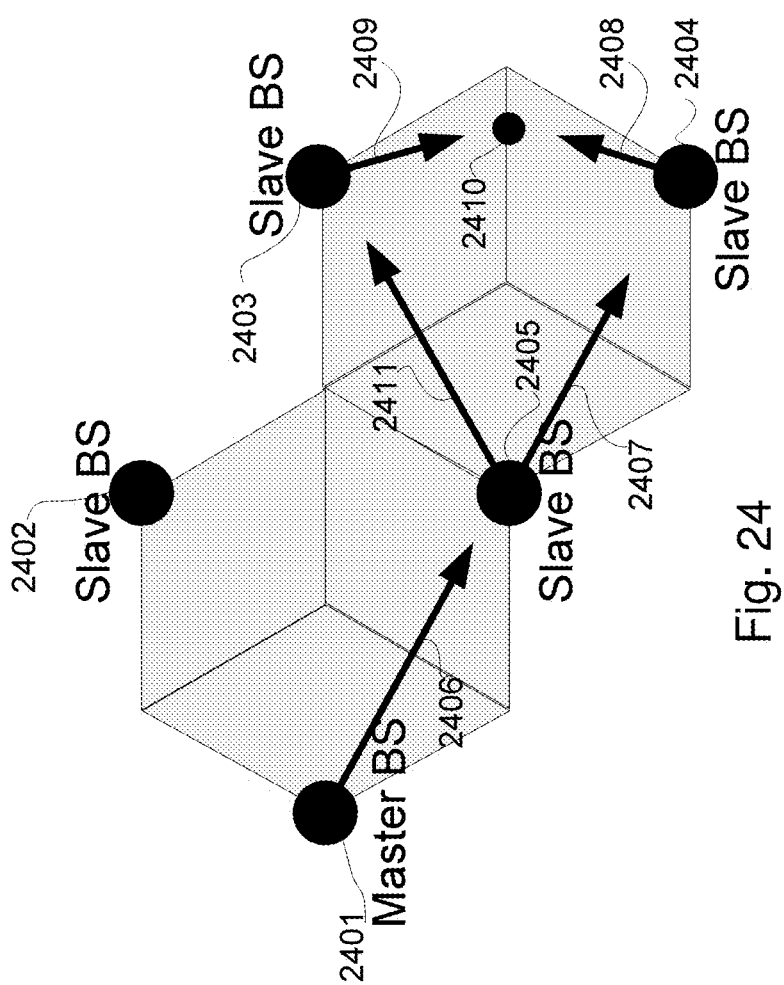
FIG. 24 is a simplified network diagram illustrating a multi-hop cluster according to an embodiment of the present invention.

Reference is now made to FIG. 24, which illustrates an exemplary cluster, according to the present embodiments, where the master-BS 2401 cannot reach all slave-BSs with a single wireless transmission. Slave-BSs 2403 and 2404 are located too far away, such that there can be no direct cooperation between 2401 and 2403 or 2404. As an example, a downlink process is described hereinbelow. The master-BS 2401 sends a message to slave-BS 2405, which decodes the message and then retransmits two messages, the first is 2407 to slave-BS 2404 and the second message is 2411 to slave-BS 2403. Each slave-BS decodes its message, and then both transmit simultaneously to client node 2410 as messages 2409, and 2408. As described in the examples referring to FIG. 12, and FIG. 13 hereinabove, the messages 2409, and 2410 can be identical or different depending on the gains to be achieved (diversity/throughput) and the client node's operational modes.

On uplink of a cluster such as in FIG. 24, the cooperation algorithms are the same as described regarding FIG. 12, but when each uplink for slave-BSs 2403, and 2404 is received, they forward messages to slave-BS 2405, which redirects these messages to master-BS 2401. This means that the cluster cooperation relies here on two hops instead of the single hop as exemplified in FIGS. 12-15. The relaying can also be performed by repeaters (e.g. amplifiers). Repeaters do not introduce delays, but do increase noise levels.

The example of FIG. 24 shows that clusters are not limited in size, and can support any number of slave-BSs, with multi-hop cooperation. The penalty in such cases may be the increased latency in decoding and transmission at the master-BS, however throughput can remain as good as in a small cluster as demonstrated in FIGS. 12-15, if the relaying does not use the same spectral resources as that of the client nodes.

Figure 25:
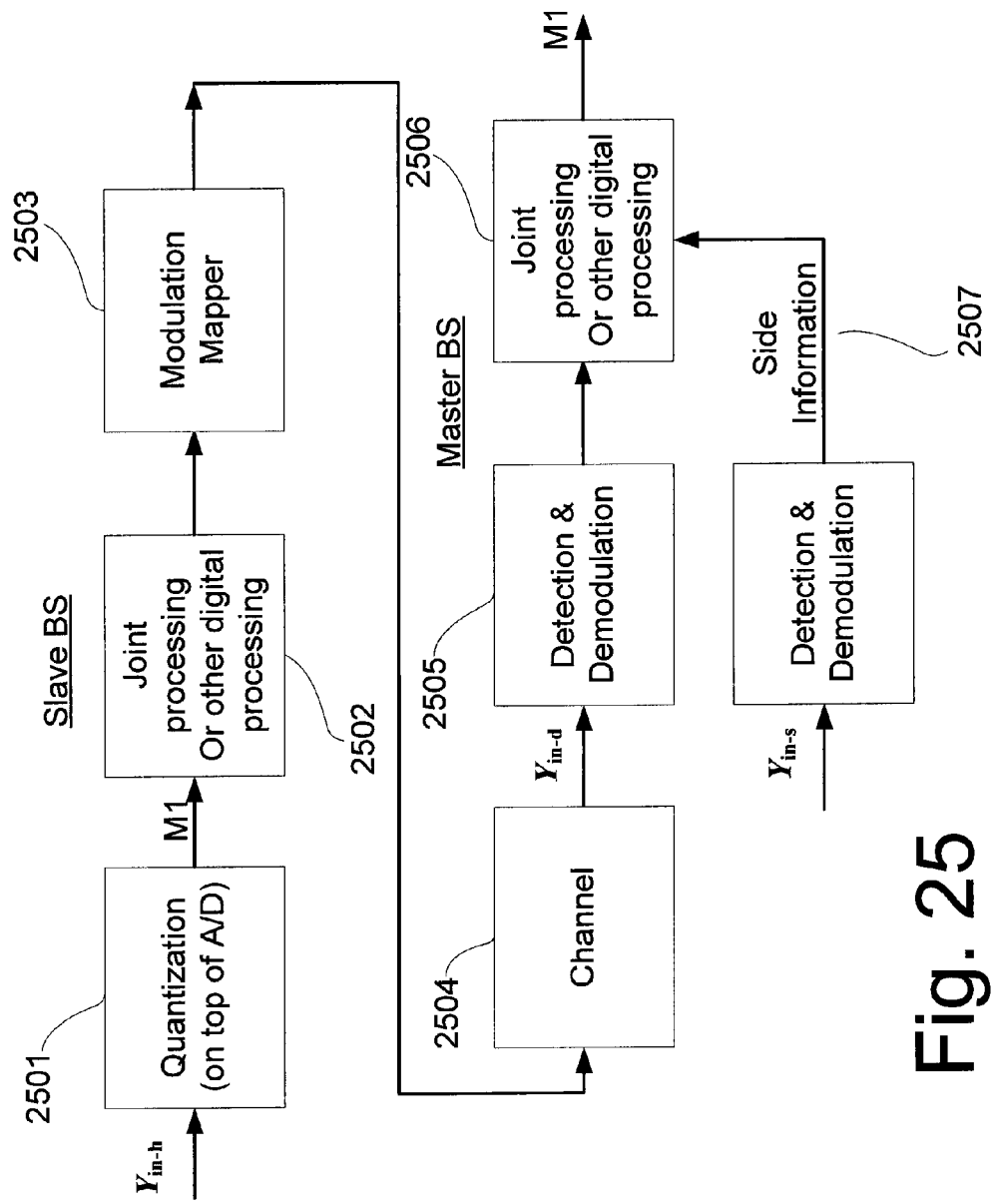
FIG. 25 is a simplified flow diagram illustrating successive steps of channel detection at the slave and at the master in a cluster according to an embodiment of the present invention.

An exception for the above limitation of FIG. 24 is when a direct wired/wireless relay link exists between every slave-BS in the cluster to the master-BS, such as shown in FIG. 25. In such case the same performance as exemplified in FIGS. 12-15 can be obtained.

The exemplified cluster includes a master-BS and slave-BSs as described and demonstrated above. The implementation of slave-BSs can include joint processing as shown in FIG. 25, joint processing as per 2502, or mere quantization 2501 and PHY level processing, since the processing is frame based. Hence the implementation complexity of the slave-BS can be rather low, and require only the PHY level processing which supports the cellular standard, and some additional functionality to support efficient preprocessing for uplink cooperation, and for relaying to the master-BS, which may also involve some dedicated MAC level functions.

The frame may be used to describe a burst of uplink or downlink, which may include multiple clients. In WiMAX 802.11e for example, the frame would be as defined for a TDD downlink uplink burst of OFDMA including a preamble, and MAP description of the active clients, and the corresponding uplink and downlink payloads.

Since a slave-BS does mainly PHY level processing as explained herein, it does not need to manage client nodes from aspects of authentication and encryption/decryption. This allows low delay relaying, and central processing only at the master-BS. On downlink for example, the slave-BS can receive an encrypted message from the master-BS, and will decode the message, but will not decrypt it, and retransmit the message at the specified rate and modulation, following the master-BS specifications.

The client node can be any device or network interface card (NIC) connecting to the wireless network as for example, a PC, PDA, cellular phone, etc.

The clustering embodiments disclosed herein are advantageous in their mobility support, as mentioned earlier. Within a cluster, a client node is aware of a single logical BS. That means that no handover between BSs of the same cluster takes place. A client node can maintain continuous connectivity within a cluster while moving inside the cluster and switching between BSs. That is, when a client node is connected to a cluster, it is actually associated with the master BS node. Therefore, when a mobile client node is received with high quality at one BS node and due to motion, is later received with high quality by another BS node within the same cluster there is no handover, and continuous communications may take place. A cluster may communicate with other conventional BSs compliant with the cellular network, as the handover process between clusters is adapted to handover between conventional BSs, and can be implemented following the cellular standard recommendations. As a particular example, soft handover protocols, as defined for example in WiMAX 802.16e standard recommendations, may be supported between clusters, as if it were a soft handover between standard stand-alone BSs.

Various features of the embodiments of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present embodiments are directed to a machine-readable medium including machine executable instructions for causing a machine, e.g., processor and associated hardware, to perform one or more of the steps of the above-described method(s).

Numerous additional variations on the methods and apparatus of the embodiments of the present invention described above will be apparent to those skilled in the art in view of the above description of the invention. Such variations are to be considered within the scope of the invention.

Figure 26:
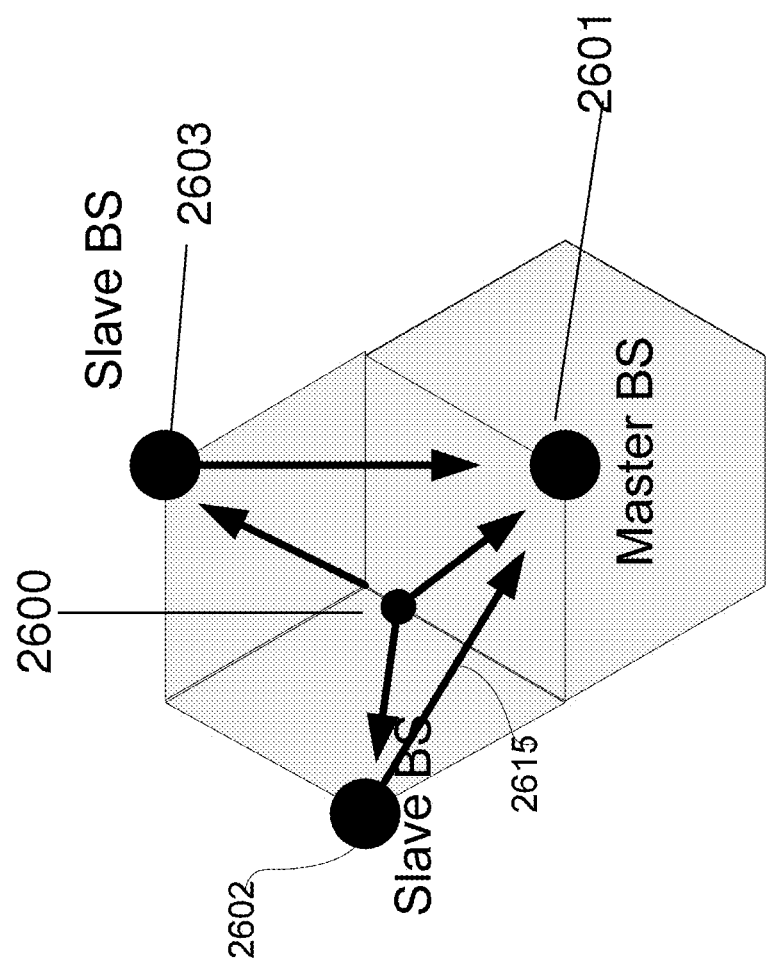
FIG. 26 is a simplified network diagram illustrating an uplink connection to three base stations of a cluster, according to an embodiment of the present invention.

Another embodiment of the current invention includes a location estimation mechanism which uses the slaves for improved location estimation. This is done by applying an estimation algorithm, which can include movement prediction, tracking, adaptive filtering and other techniques, on the multiple signal receptions available at the master BS. Such an approach improves on the prior art by using a richer data-base for the estimation, which is combined from all the signal receptions from all the slaves in the cluster, not just a subset of the signal reception, and by carrying out the estimation within the master BS, and not at the slaves BSs. Such an approach can even reduce the need for any kind of dedicated signal transmission from the mobile users. This is demonstrated in an example illustrated in FIG. 26, where the location of a mobile station location 2600 is estimated by the master BS 2601 using the receptions at two slave BSs 2602 and 2603 and its own reception.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for the sake of brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A wireless network system comprising:
a plurality of network nodes, each configured to manage active links to mobile stations within a range; and
a controller configured to control said network nodes to provide at least two active links from at least two different network nodes from among said plurality of network nodes simultaneously to a given mobile station in an integral manner for joint signal processing,
wherein at least one network node from among said plurality of network nodes has an active link which is a helper link to said mobile station,
wherein said controller is configured to decode a transmission of said mobile station by using joint signal processing results from at least two of said plurality of network nodes, and
wherein one of said active links is a main link and others of said active links are helper links.

2. A wireless network system comprising:
a plurality of network nodes, each configured to manage active links to mobile stations within a range; and
a controller configured to control said network nodes to provide at least two active links from at least two different network nodes from among said plurality of network nodes simultaneously to a given mobile station in an integral manner for joint signal processing,
wherein at least one network node from among said plurality of network nodes has an active link which is a helper link to said mobile station, wherein said controller is configured to decode a transmission of said mobile station by using joint signal processing results from at least two of said plurality of network nodes, and wherein said controller is configured such that one of said active links is used to provide side information for a second of said active links.

3. A wireless network system comprising:

a plurality of network nodes, each configured to manage active links to mobile stations within a range; and a controller configured to control said network nodes to provide at least two active links from at least two different network nodes from among said plurality of network nodes simultaneously to a given mobile station in an integral manner for joint signal processing, wherein at least one network node from among said plurality of network nodes has an active link which is a helper link to said mobile station, wherein said controller is configured to decode a transmission of said mobile station by using joint signal processing results from at least two of said plurality of network nodes, and wherein a first of said network nodes is configured to provide joint signal processing of a respective helper link and to forward a result thereof to a second of said network nodes for further joint signal processing with a respective active link thereat.

4. A wireless network system comprising:

a plurality of network nodes, each configured to manage active links to mobile stations within a range; and a controller configured to control said network nodes to provide at least two active links from at least two different network nodes from among said plurality of network nodes simultaneously to a given mobile station in an integral manner for joint signal processing, wherein at least one network node from among said plurality of network nodes has an active link which is a helper link to said mobile station, wherein said controller is configured to decode a transmission of said mobile station by using joint signal processing results from at least two of said plurality of network nodes, and wherein said network nodes are base stations, and one of said base stations is configured as a master base station and at least one other of said base stations is configured as a slave base station, thereby forming a base station cluster.

5. The system of claim 4, wherein said master base station is configured to manage said active links within said cluster, thereby providing a transparent handover within said cluster.

6. The system of claim 5, wherein said cluster is configured with a single base station address to appear externally as a single base station.

7. The system of claim 5, wherein each base station in said cluster is configured to decode uplink information of all mobile stations which are clients of said cluster, wherein each base station is able to decode and forward resulting observations directly to an access server gateway or to the master base station, and wherein the master base station is configured to decode remaining undecoded information by combining respective resulting observations.

8. The system of claim 7, further comprising a location estimator for estimating a location of a given mobile station based on said combining of respective resulting observations.

9. The system of claim 7, wherein at least some of said forwarding to said master base station is forwarded either via one of an intermediate base station and a backhaul channel.

10. The system of claim 7, wherein said links comprise uplinks and downlinks.

11. The system of claim 7, wherein clustering of base stations is carried out dynamically.

12. A wireless network system comprising:

a plurality of network nodes, each configured to manage active links to mobile stations within a range; and a controller configured to control said network nodes to provide at least two active links from at least two different network nodes from among said plurality of network nodes simultaneously to a given mobile station in an integral manner for joint signal processing, wherein at least one network node from among said plurality of network nodes has an active link which is a helper link to said mobile station, wherein said controller is configured to decode a transmission of said mobile station by using joint signal processing results from at least two of said plurality of network nodes, wherein one of said network nodes is a helping base station, and wherein at least one of received signal compression and error correcting coding are jointly performed on a received signal, prior to forwarding to a destination node among said plurality of network nodes.

13. A method for wireless networking comprising:

providing a plurality of base stations to manage active links to mobile stations within a range;

controlling said base stations to provide at least two active links from two base stations simultaneously to a given mobile station in an integral manner for joint signal processing; and providing at least one base station from among said plurality of base stations with a helper link to said mobile station, wherein said controlling comprises jointly processing said two active links to encode transmissions to said mobile station, wherein said base stations and said mobile station are network nodes, and said controlling comprises processing using four network nodes, wherein one of said four network nodes is a receiving mobile station, two of said four network nodes are transmitting base stations performing joint signal processing on an input from a fourth network node of said four network nodes for further joint processing with the respective active link of said fourth network node, wherein the active links are downlinks, for downlink collaboration, wherein the base stations are arranged in clusters, the active links being transmitted from base stations of a same cluster, and wherein the method further comprises each of said base stations separately performing beamforming, the base stations applying a space-time coding permutation between themselves.

14. A method for wireless networking comprising:

providing a plurality of base stations to manage active links to mobile stations within a range;

controlling said base stations to provide at least two active links from two base stations simultaneously to a given mobile station in an integral manner for joint signal processing; and providing at least one base station from among said plurality of base stations with a helper link to said mobile station, wherein said controlling comprises jointly processing said two active links to encode transmissions to said mobile station, wherein said base stations and said mobile station are network nodes, and said controlling comprises processing using four network nodes, wherein one of said four network nodes is a receiving mobile station, two of said four network nodes are transmitting base stations performing joint signal processing on an input from a fourth network node of said four network nodes for further joint processing with the respective active link of said fourth network node, wherein the active links are downlinks, for downlink collaboration, wherein the base stations are arranged in clusters, the active links being transmitted from base stations of a same cluster, and wherein the method further comprises each of said base stations separately using a respectively different cyclic shift delay in downlink OFDM, thereby avoiding unintentional beamforming.

15. A method for wireless networking comprising:

providing a plurality of base stations to manage active links to mobile stations within a range;

controlling said base stations to provide at least two active links from two base stations simultaneously to a given mobile station in an integral manner for joint signal processing; and providing at least one base station from among said plurality of base stations with a helper link to said mobile station, wherein said controlling comprises jointly processing said two active links to encode transmissions to said mobile station, wherein said base stations and said mobile station are network nodes, and said controlling comprises processing using four network nodes, wherein one of said four network nodes is a receiving mobile station, two of said four network nodes are transmitting base stations performing joint signal processing on an input from a fourth network node of said four network nodes for further joint processing with the respective active link of said fourth network node, wherein said active links are downlinks, for downlink collaboration, and wherein the base stations are clustered into slave base stations and a master base station, said downlinks being controlled by the master base station, and each base station in the cluster having a same address such that collaboration within the cluster is transparent.

16. A wireless network system comprising:

a plurality of network nodes, each configured to manage active links to mobile stations within a range; and a controller configured to control said network nodes to provide at least two active links from at least two different network nodes from among said plurality of network nodes simultaneously to a given mobile station in an integral manner for joint signal processing, wherein at least one network node from among said plurality of network nodes has an active link which is a helper link to said mobile station, wherein said controller comprises a joint signal processing unit to jointly process said two active links to decode transmissions of said mobile station, wherein said controller is configured to pass a joint processing result of a first one of said network nodes to each of a second one and third one of said network nodes for further joint signal processing with the respective active links thereat, and wherein one of said active links is a main link and others of said active links are helper links.

17. A wireless network system comprising:

a plurality of network nodes, each configured to manage active links to mobile stations within a range; and a controller configured to control said network nodes to provide at least two active links from at least two different network nodes from among said plurality of network nodes simultaneously to a given mobile station in an integral manner for joint signal processing, wherein at least one network node from among said plurality of network nodes has an active link which is a helper link to said mobile station, wherein said controller comprises a joint signal processing unit to jointly process said two active links to decode transmissions of said mobile station, wherein said controller is configured to pass a joint processing result of a first one of said network nodes to each of a second one and third one of said network nodes for further joint signal processing with the respective active links thereat, and wherein said joint signal processing unit is configured such that one of said active links is used to provide side information for a second of said active links.

18. A wireless network system comprising:

a plurality of network nodes, each configured to manage active links to mobile stations within a range; and a controller configured to control said network nodes to provide at least two active links from at least two different network nodes from among said plurality of network nodes simultaneously to a given mobile station in an integral manner for joint signal processing, wherein at least one network node from among said plurality of network nodes has an active link which is a helper link to said mobile station, wherein said controller comprises a joint signal processing unit to jointly process said two active links to decode transmissions of said mobile station, wherein said controller is configured to pass a joint processing result of a first one of said network nodes to each of a second one and third one of said network nodes for further joint signal processing with the respective active links thereat, and wherein a first of said network nodes is configured to provide joint signal processing of a respective helper link and to forward a result thereof to a second of said network nodes for further joint signal processing with a respective active link thereat.

19. A wireless network system comprising:

a plurality of network nodes, each configured to manage active links to mobile stations within a range; and a controller configured to control said network nodes to provide at least two active links from at least two different network nodes from among said plurality of network nodes simultaneously to a given mobile station in an integral manner for joint signal processing, wherein at least one network node from among said plurality of network nodes has an active link which is a helper link to said mobile station, wherein said controller comprises a joint signal processing unit to jointly process said two active links to decode transmissions of said mobile station, wherein said controller is configured to pass a joint processing result of a first one of said network nodes to each of a second one and third one of said network nodes for further joint signal processing with the respective active links thereat, and wherein said network nodes are base stations, and one of said base stations is configured as a master base station and at least one other of said base stations is configured as a slave base station, thereby forming a base station cluster.

20. The system of claim 19, wherein said master base station is configured to manage said active links within said cluster, thereby providing a transparent handover within said cluster.

21. The system of claim 20, wherein said cluster is configured with a single base station address to appear externally as a single base station.

22. The system of claim 20, wherein each base station in said cluster is configured to decode uplink information of all mobile stations which are clients of said cluster, wherein each base station is able to decode and forward resulting observations directly to an access server gateway or to the master base station, and wherein the master base station is configured to decode remaining undecoded information by combining respective resulting observations.

23. The system of claim 22, further comprising a location estimator for estimating a location of a given mobile station based on said combining of respective resulting observations.

24. The system of claim 22, wherein at least some of said forwarding to said master base station is forwarded either via one of an intermediate base station and a backhaul channel.

25. The system of claim 22, wherein said links comprise uplinks and downlinks.

26. The system of claim 22, wherein clustering of base stations is carried out dynamically.

27. A wireless network system comprising:

a plurality of network nodes, each configured to manage active links to mobile stations within a range; and a controller configured to control said network nodes to provide at least two active links from at least two different network nodes from among said plurality of network nodes simultaneously to a given mobile station in an integral manner for joint signal processing, wherein at least one network node from among said plurality of network nodes has an active link which is a helper link to said mobile station, wherein said controller comprises a joint signal processing unit to jointly process said two active links to decode transmissions of said mobile station, wherein said controller is configured to pass a joint processing result of a first one of said network nodes to each of a second one and third one of said network nodes for further joint signal processing with the respective active links thereat, and wherein one of said network nodes is a helping base station, and wherein at least one of received signal compression and error correcting coding are jointly performed on a received signal, prior to forwarding to a destination node among said plurality of network nodes.

* * * * *